United States Patent [19]

Kleinhen et al.

[11] Patent Number: 5,069,598
[45] Date of Patent: Dec. 3, 1991

[54] APPARATUS AND METHOD FOR LOADING SHEET MATERIAL ARTICLES

[75] Inventors: Stephen R. Kleinhen, Eaton; Robert A. Bryson, Sr., Huber Hts., both of Ohio

[73] Assignee: AM International Incorporated, Chicago, Ill.

[21] Appl. No.: 566,616

[22] Filed: Aug. 13, 1990

Related U.S. Application Data

[63] Continuation-in-part of Ser. No. 261,394, Oct. 24, 1988, abandoned.

[51] Int. Cl.⁵ ............................................. B65G 57/00
[52] U.S. Cl. .................................. 414/790; 414/790.4; 414/923; 198/414; 198/468.9; 271/207; 271/214; 271/217
[58] Field of Search ................. 414/222, 788.8, 788.9, 414/789.2, 789.3, 789.9, 790, 790.1, 790.3, 790.4, 790.9, 791.1, 792.7, 923; 271/3.1, 207, 306, 214, 217; 198/412–414, 468.9

[56] References Cited

U.S. PATENT DOCUMENTS

| | | | |
|---|---|---|---|
| 3,295,660 | 3/1965 | Nelson | 198/414 |
| 3,762,579 | 10/1973 | Schade | 414/790.4 X |
| 3,888,363 | 6/1975 | Erekson | 414/790.4 |
| 4,299,076 | 11/1981 | Humphrey | 198/412 X |
| 4,451,191 | 5/1984 | Torre | 414/790.4 X |
| 4,462,735 | 7/1984 | Bain et al. | 414/790.4 X |
| 4,538,511 | 9/1985 | Wise | 414/794.4 |
| 4,711,342 | 12/1987 | Abraham | 198/468.9 |
| 4,977,827 | 12/1990 | Chandhoke et al. | 414/790 X |

Primary Examiner—H. Grant Skaggs
Assistant Examiner—Boris Milef
Attorney, Agent, or Firm—Tarolli, Sundheim & Covell

[57] ABSTRACT

An improved apparatus for sequentially loading sheet material articles into a plurality of compartments in a plurality of containers includes a loader assembly which is disposed at a loading station. An infeed shuttle assembly moves an empty container to a carriage disposed at the loading station. The carriage is movable back and forth along a linear path to sequentially position compartments of the empty container at the loading station. In addition, the carriage is operable to rotate the container about a vertical axis to at least partially position another compartment at the loading station. When the compartments of the container have been loaded with sheet material articles, an outfeed shuttle assembly engages the loaded container and moves it away from the carriage.

80 Claims, 14 Drawing Sheets

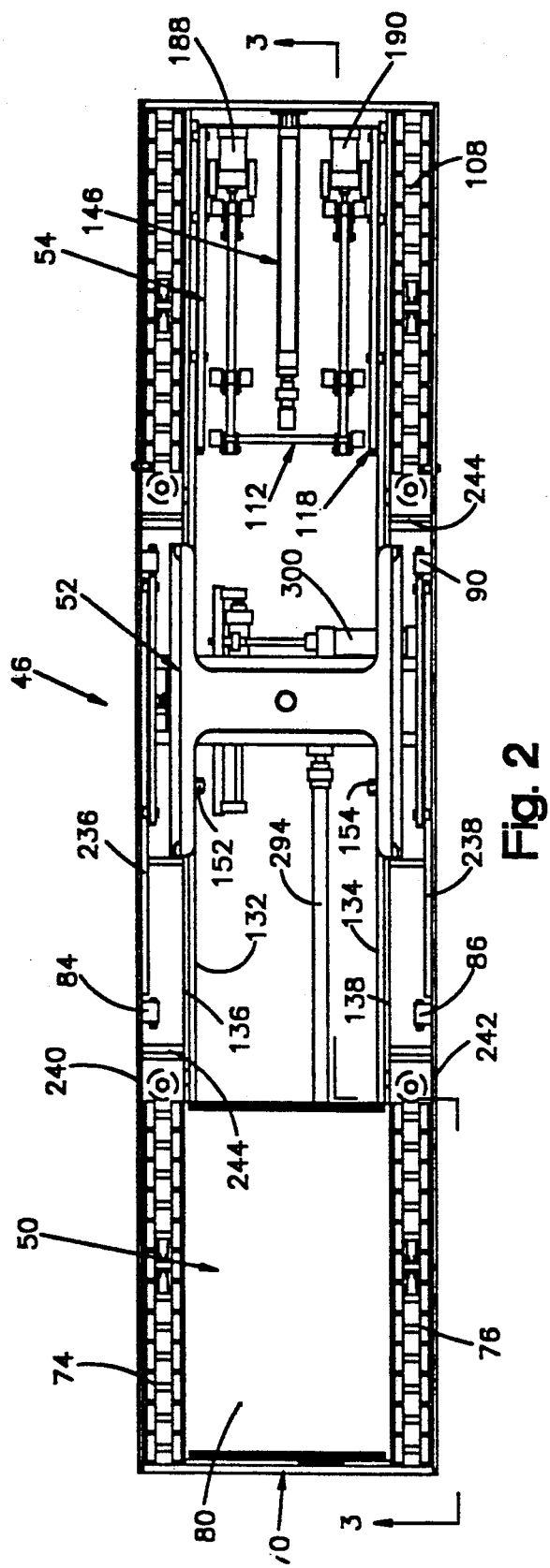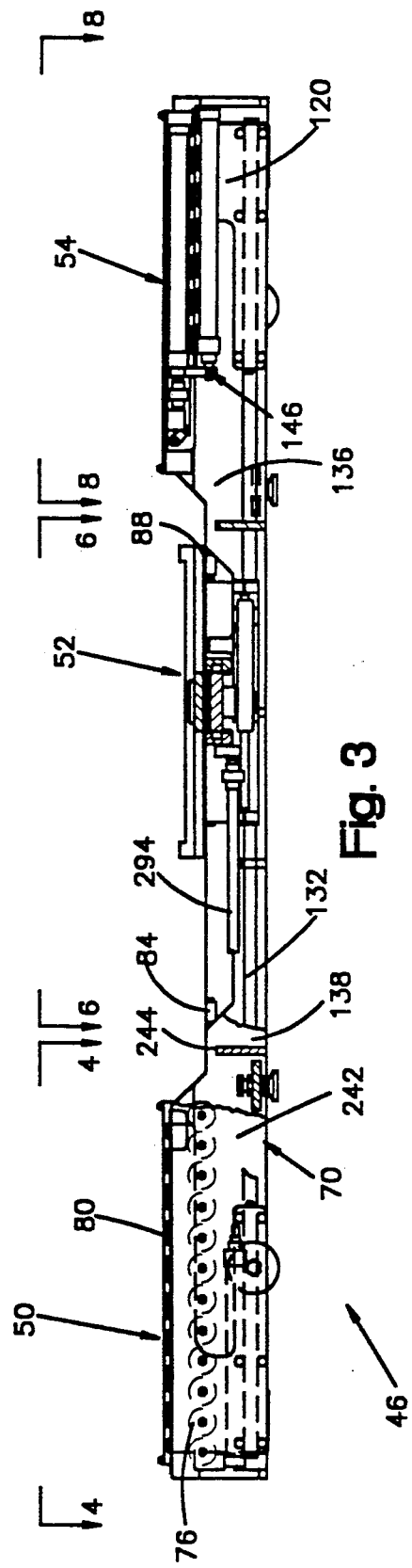
Fig. 2
Fig. 3

APPARATUS AND METHOD FOR LOADING SHEET MATERIAL ARTICLES

RELATED APPLICATION

This application is a continuation-in-part of copending U.S. Application Ser. No. 261,394 filed Oct. 24, 1988 by Robert A. Bryson, Sr. and entitled "Signature Handling Apparatus" (now abandoned).

BACKGROUND OF THE INVENTION

The present invention relates to a new and improved apparatus and method for use in sequentially loading sheet material articles into a plurality of compartments in each of a plurality of containers.

During the operation of a printing press, it is frequently advantageous to provide buffer storage for sections of a newspaper or magazine. When needed, sections of a newspaper or magazine are moved out of storage and collated with other sections of the newspaper or magazine. An apparatus for storing newspaper sections is disclosed in U.S. Pat. No. 4,462,735.

This patent discloses an endless conveyor which has carriers adapted to travel along a pathway to support containers for receiving newspapers A pair of spaced transfer conveyors are adapted to sequentially receive and then return containers to the endless conveyor. On one transfer conveyor, the containers are positioned at a loading station by an indexing member.

SUMMARY OF THE PRESENT INVENTION

The present invention provides a new and improved apparatus and method for sequentially loading sheet material articles into a plurality of compartments in each of a plurality of containers To load an empty container, the container is moved to a first or infeed shuttle assembly. The empty container is transferred from the infeed shuttle assembly to a carriage assembly. The transfer of the empty container from the infeed shuttle assembly to the carriage assembly may be accomplished by moving the shuttle assembly and carriage assembly into an overlapping relationship. The infeed shuttle assembly and carriage assembly may then be moved vertically relative to each other to transfer the empty container from the shuttle assembly to the carriage assembly.

Once the empty container has been transferred from the infeed shuttle assembly to the carriage assembly, each of the compartments in the empty container is filled in turn with sheet material articles while the container is supported by the carriage assembly. The carriage assembly is movable relative to a loader or stacker assembly to sequentially position the compartments of the container at a loading station. In order to position the empty compartments of the container at the loading station, the carriage assembly may advantageously be operated to move the empty container along a linear path and to rotate the container about a vertical axis.

Once the various compartments in the container have been loaded with sheet material articles, the container is transferred from the carriage assembly to a second or outfeed shuttle assembly. This may be accomplished by moving the outfeed shuttle assembly into an overlapping relationship with the carriage assembly and providing vertical movement between the loaded container and the outfeed shuttle assembly. The carriage assembly and outfeed shuttle assembly are then moved out of the overlapping relationship with each other while the container is supported by the outfeed shuttle assembly.

BRIEF DESCRIPTION OF THE DRAWINGS

The foregoing and other features of the present invention will become more apparent upon a consideration of the following description taken in connection with the accompanying drawings, wherein:

FIG. 2 is a top plan view of a container handling assembly used in the apparatus of FIG. 1 to sequentially position empty compartments of a container at a loading station and to move a loaded container away from the loading station;

FIG. 3 is an elevational view, taken generally along the line 3—3 of FIG. 2, further illustrating the construction of the container handling assembly;

DESCRIPTION OF SPECIFIC PREFERRED EMBODIMENTS OF THE INVENTION

General Description

Figure 1:
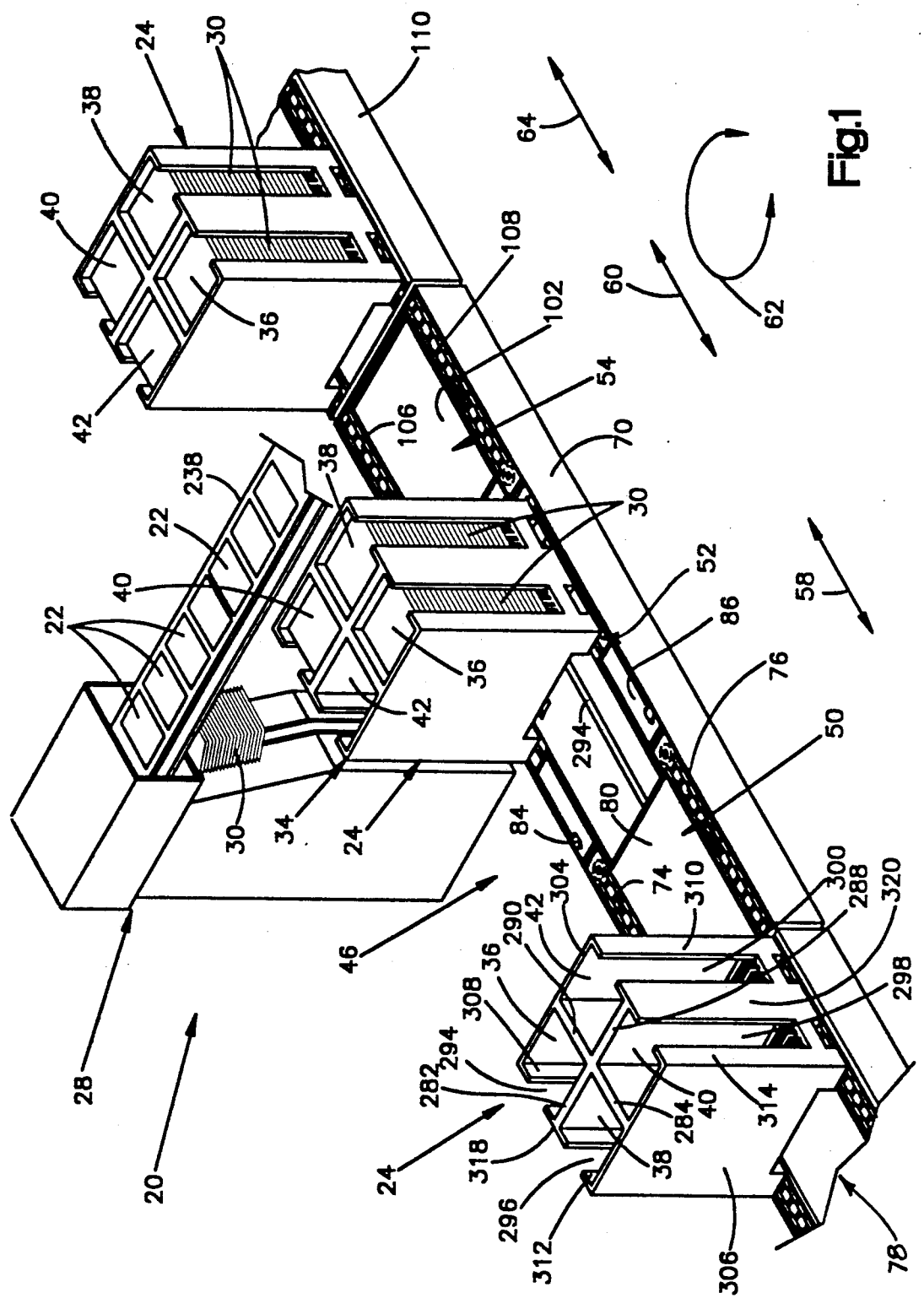
FIG. 1 is a schematicized pictorial illustration of an apparatus constructed in accordance with the present invention to sequentially load sheet material articles into a plurality of compartments in each of a plurality of containers.

A sheet material handling apparatus 20 (FIG. 1) is constructed and operated in accordance with the present invention. The apparatus 20 sequentially loads sheet material articles or signatures 22 into containers 24 for storage until such time as the signatures are required. The sheet material handling apparatus 20 includes a loader or stacker assembly 28. The loader assembly 28 is operable to load a stack 30 of signatures 22 into an empty compartment of a container 24 while the empty compartment is at a loading station 34.

Each of the containers 24 includes a plurality of compartments disposed in a rectangular array. Thus, each of the containers includes rectangular compartments 36, 38, 40 and 42. A container handling assembly 46 constructed in accordance with the present invention is operable to position each of the empty compartments 36-42 at the loading station 34 to enable the compartments to be sequentially filled with stacks 30 of signatures 22.

The container handling assembly 46 (FIGS. 1-3) includes a left or infeed shuttle assembly 50, a carriage assembly 52 and a right or outfeed shuttle assembly 54. The infeed shuttle assembly 50 reciprocates along a linear path, as indicated schematically by the arrow 58 in FIG. 1. The infeed shuttle assembly 50 is operable from a retracted condition shown in FIGS. 1-3, to an extended condition disposed in overlapping relationship with the carriage assembly 52. Operation of the infeed shuttle assembly 50 from the retracted condition to the extended condition moves an empty container 24 to a position adjacent to the loader assembly 28. The infeed shuttle assembly 50 is then operable to transfer the empty container to the carriage assembly 52. Once the empty container has been transferred to the carriage assembly 52, the infeed shuttle assembly is returned to the retracted condition.

The carriage assembly 52 reciprocates along a linear path, in the manner indicated schematically by the arrow 60 in FIG. 1, to position empty compartments in the container 24 relative to the loader assembly 28. In addition, the carriage assembly 52 is also operable to rotate the container 24 about a vertical axis, in the manner indicated schematically by the arrow 62 in FIG. 1, during the positioning of empty compartments in the container 24 at the loading station 34. By a combination of linear and rotational movements, indicated by the arrows 60 and 62 in FIG. 1, the carriage assembly 52 is operable to sequentially position each of the compartments 36, 38, 40 and 42 in turn at the loading station 34 to enable the loader or stacker assembly 28 to load a stack 30 of signatures 22 into each of the compartments A second or outfeed shuttle assembly 54 reciprocates along the linear path, in the manner indicated schematically by the arrow 64 in FIG. 1, to move loaded containers 24 from the carriage assembly 52. The outfeed shuttle assembly 54, carriage 52 and infeed shuttle assembly 50 all reciprocate along the same linear path.

When a loaded container 24 is to be transferred from the carriage assembly 52, the outfeed shuttle assembly 54 is operated from a retracted condition, shown in FIGS. 1-3, to an extended condition in which the outfeed shuttle assembly is disposed in an overlapping relationship with the carriage assembly 52. The loaded container 24 is transferred from the carriage assembly 52 to the outfeed shuttle assembly 54. The outfeed shuttle assembly 54 is then returned to the retracted condition. This moves the loaded container 24 away from the loading station 34.

The foregoing description has assumed that the empty containers 24 move from the left to the right, as viewed in FIG. 1. However, the container handling assembly 46 can be used to move containers from right to left if desired. Thus, the right shuttle assembly 54 could be used to move empty containers to the carriage assembly 52 and the left shuttle assembly 50 could be used to move loaded containers from the carriage assembly. This can be readily done because the shuttle assemblies 50 and 54 have the same construction and mode of operation.

The container handling assembly 46 includes a rectangular main frame 70 which encloses the shuttle assemblies 50 and 54 and carriage assembly 52 (FIG. 2). A pair of roller conveyor segments 74 and 76 are disposed within the main frame 70 (FIGS. 2 and 3) on opposite sides of the infeed shuttle assembly 50. A suitable conveyor assembly 78 (FIG. 1) sequentially moves empty containers 24 onto the roller conveyor segments 74 and 76 to position the empty containers over the infeed shuttle assembly 50. The infeed shuttle assembly 50 (FIGS. 4 and 5) includes a platform assembly 80 which can be raised to lift an empty container 24 off of the roller conveyor segments 74 and 76. Once an empty container 24 has been lifted off of the conveyor assembly 78 by the platform assembly 80, the empty container is supported by the infeed shuttle assembly 50 and is free to move with the infeed shuttle assembly.

Figure 4:
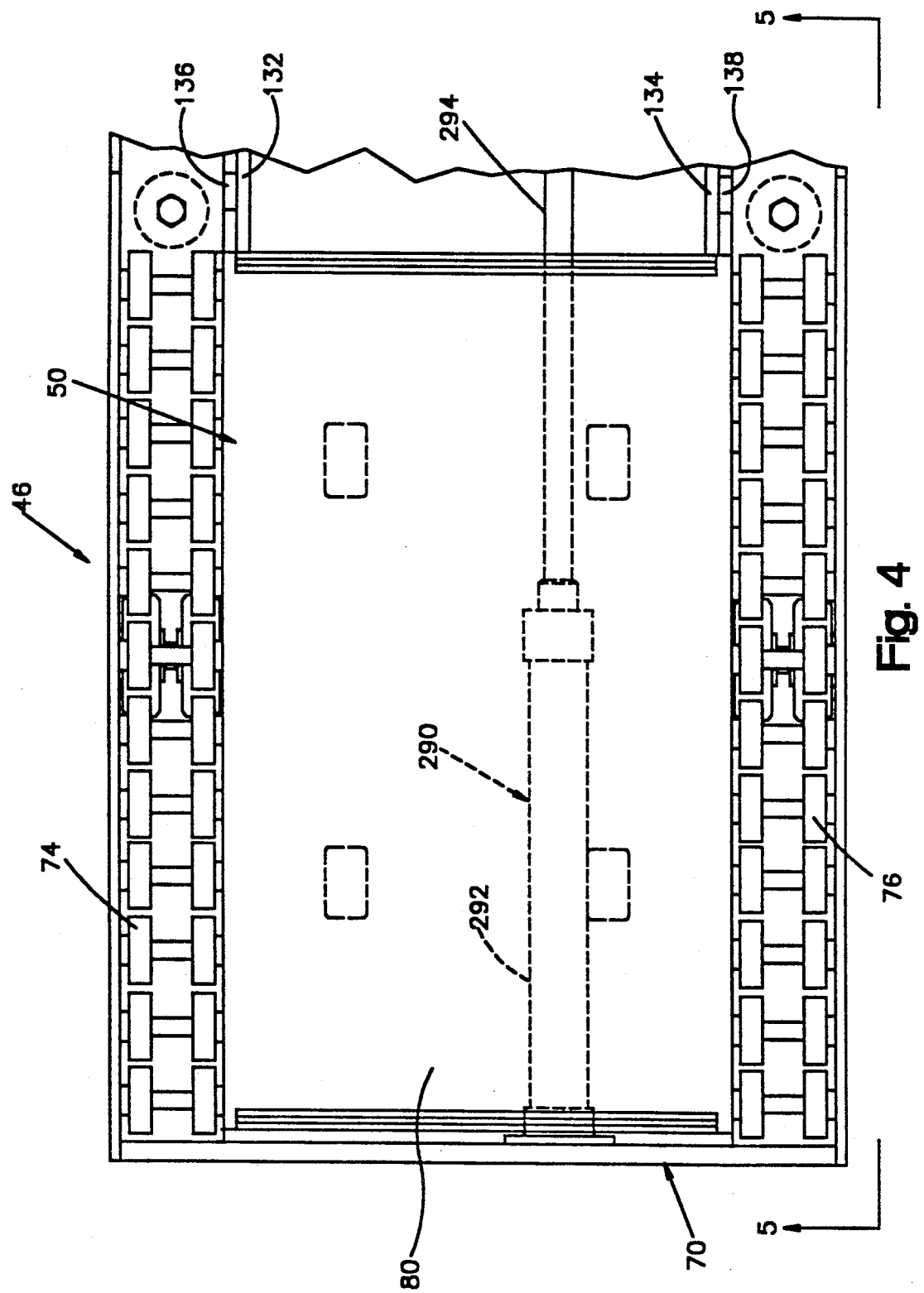
FIG. 4 is a plan view, taken generally along the line 4—4 of FIG. 3, illustrating the construction of an infeed shuttle assembly which engages an empty container and moves the empty container toward the loading station.
Figure 5:
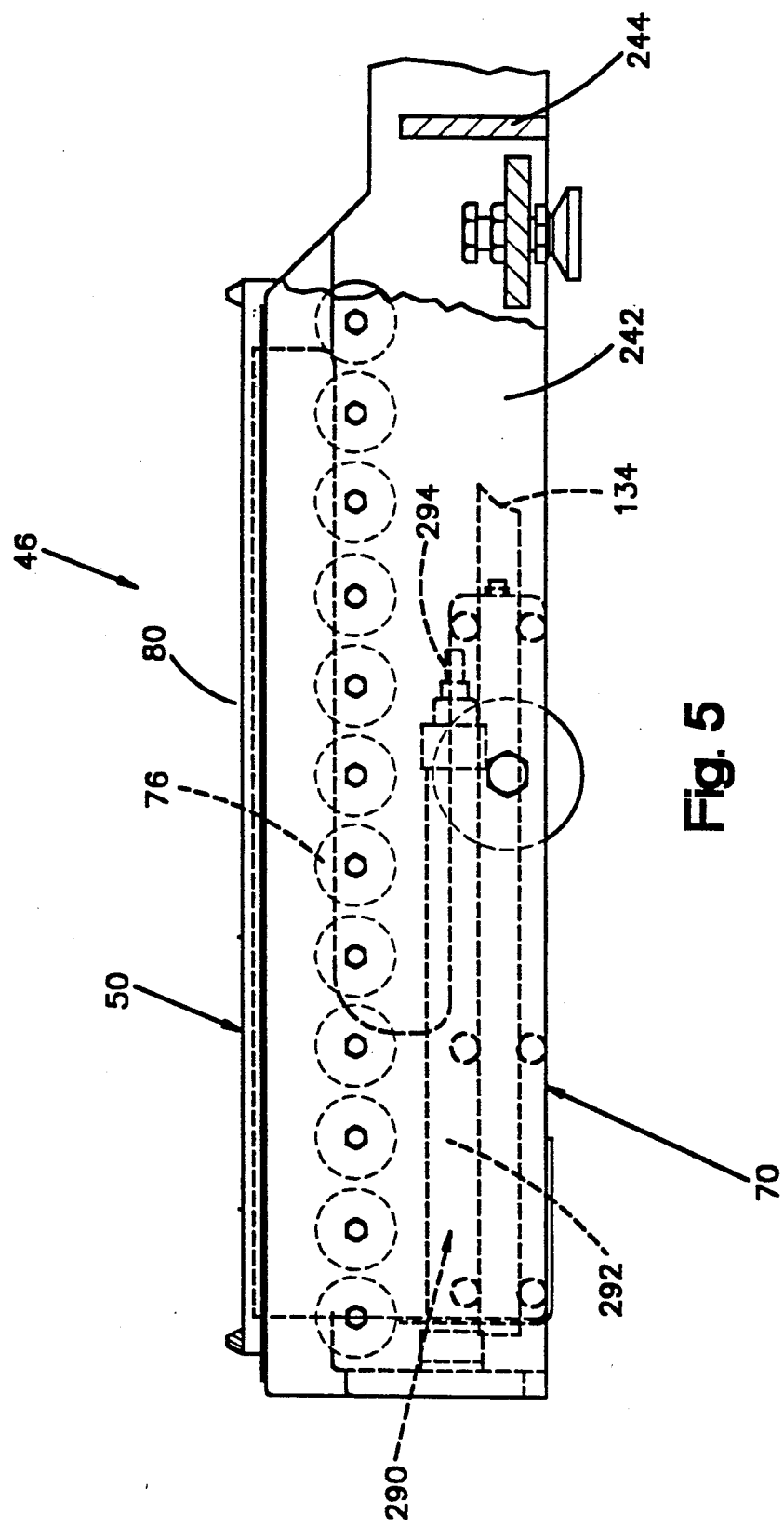
FIG. 5 is a side elevational view, taken generally along the line 5—5 of FIG. 4, further illustrating the construction of the infeed shuttle assembly.

The infeed shuttle assembly is operable from the retracted condition shown in FIG. 4 to an extended condition in which the platform assembly 80 is in an overlapping relationship- with the carriage assembly 52. At this time, the carriage assembly 52 will be at a left (as viewed in FIG. 6) end of stroke position, indicated in dashed lines in FIG. 6. When the carriage assembly 52 is at the left end of stroke position, the carriage assembly engages the left carriage stops 84 and 86 to limit leftward movement of the carriage assembly 52.

Figure 6:
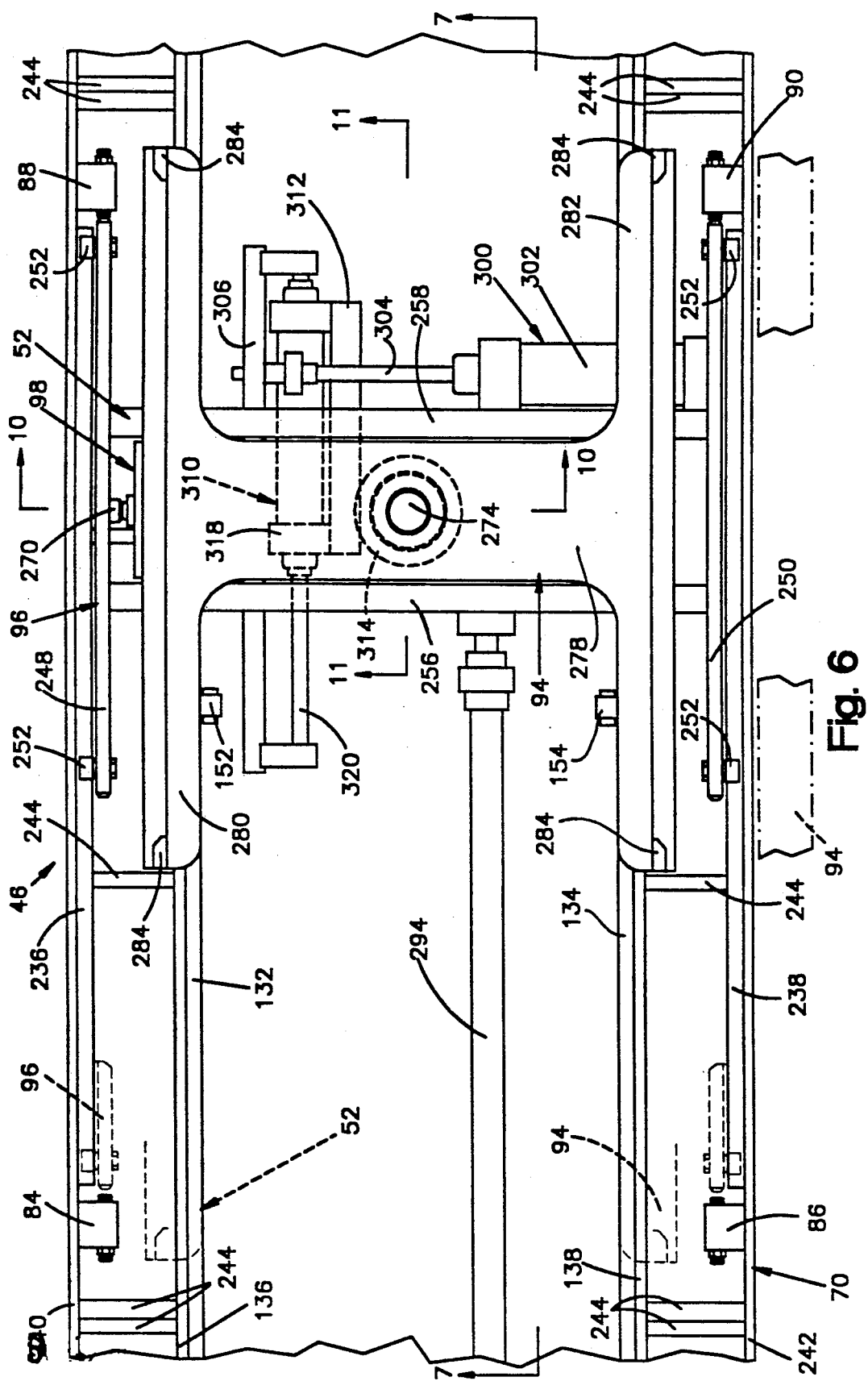
FIG. 6 is a plan view, taken generally along the line 6—6 of FIG. 3, illustrating the construction of a carriage assembly which is operable to sequentially move empty compartments of a container to the loading station.

When the carriage assembly 52 is at the left end of stroke position, indicated in dashed lines in FIG. 6, the infeed shuttle assembly 50 is movable to an extended condition in which the carriage assembly and the infeed shuttle assembly are in an overlapping relationship. When the carriage 52 and infeed shuttle assembly 50 have been moved into an overlapping relationship, the shuttle platform assembly 80 (FIGS. 4 and 5) is lowered to transfer an empty container 24 from the infeed shuttle assembly 50 to the carriage assembly 52. Once the empty container 24 has been transferred to the carriage assembly 52, the infeed shuttle assembly 50 is moved out of the overlapping relationship with the carriage assembly 52 and back to the retracted condition shown in FIG. 4. At this time, the infeed shuttle assembly 50 is offset to the left (as viewed in FIG. 2) of the carriage assembly 52 even though the carriage assembly is at its leftward end of stroke position in engagement with the stops 84 and 86.

The empty container 24 (FIG. 1) is transferred to the carriage assembly 52 with the first compartment 36 of the container at the loading station 34. Thus, when the carriage assembly 52 is at the left end of stroke position, a container compartment on the right half of the carriage assembly is at the loading station 34. A stack 30 of signatures 22 is moved into the first compartment 36 of the container 24 while the compartment is at the loading station 34.

Once the first compartment 36 of the container 24 has been filled with a stack 30 of signatures 22, the carriage assembly 52 is moved along a linear path from the left end of stroke position shown in dashed lines in FIG. 6 to the right end of stroke position, shown in solid lines in FIG. 6. When the carriage assembly 52 is in the right end of stroke position, indicated in solid lines in FIG. 6, the carriage assembly engages stops 88 and 90. When the carriage assembly 52 is at the right end of stroke position, the second compartment 38 of the container 24 is at the loading station 34. Thus, when the carriage assembly 52 is at the right end of stroke position, a container compartment on the left half of the carriage assembly is at the loading station 34. Operation of the loader or stacker assembly 28 moves a stack 30 of signatures 22 into the second compartment 38 of the container 24.

After the two compartments 36 and 38 of the container 24 have been filled with signatures, the container 24 must be rotated to position the remaining two compartments, that is the compartments 40 and 42, adjacent to the loader assembly 28. To rotate the container 24 about a vertical axis, a container support section or turntable 94 of the carriage assembly 52 is rotated through 180° relative to a base or lower section 96 of the carriage assembly 52 (FIG. 6). Before the turntable or upper section 94 of the carriage assembly 52 can be rotated relative to the base or lower section 96 of the carriage assembly, the turntable must be moved away from the loader assembly 28 to provide clearance between the turntable and the loader assembly as the turn table rotates.

Figure 7:
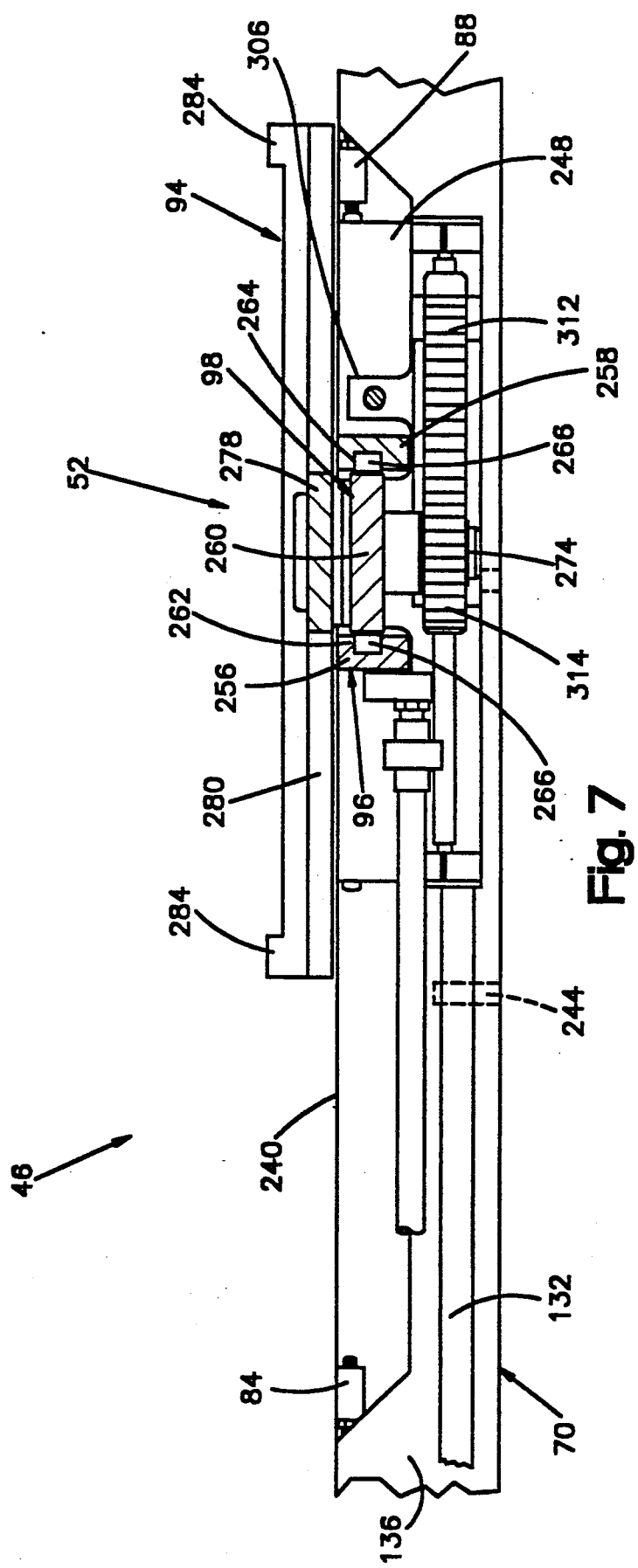
FIG. 7 is an elevational sectional view, taken generally along the line 7—7 of FIG. 6, further illustrating the construction of the carriage assembly.

To enable the turntable 94 to be moved away from the loader assembly 28, the turntable is mounted on a cross slide or intermediate section 98 (FIGS. 6 and 7). The intermediate section 98 is movable along a path which is perpendicular to the path along which the carriage assembly 52 and shuttle assemblies 50 and 54 are reciprocated. By moving the intermediate section 98 outwardly, the turntable 94 is moved from the position shown in solid lines to the position shown in dash-dot lines in FIG. 6. When the turntable 94 has been moved to the outward position, indicated in dash-dot lines in FIG. 6, the turntable 94 can be rotated through 180° about its vertical central axis.

The 180° rotation of the turntable 94 moves the previously filled compartments 36 and 38 away from the loader assembly 28 and moves the empty compartments 40 and 42 toward the loader assembly 28. The intermediate section 98 of the carriage assembly 52 is then moved inwardly to the position shown in solid lines in FIG. 6. This positions the empty compartments 40 and 42 of the container 24 adjacent to the loader assembly 28 in the manner shown in FIG. 1.

The empty compartment 40 is filled before the empty compartment 42. Therefore, the carriage assembly 52 is also moved leftwardly from the position shown in solid lines in FIG. 6 to the position shown in dashed lines in FIG. 6. When the carriage assembly has been moved to the dashed line position shown in FIG. 6, the base section 96 of the carriage assembly engages the left stop 84. At this time, the empty container compartment 40 is positioned at the loading station 34. Therefore, operation of the loader assembly 28 is effective to move a stack 30 of signatures or sheet material articles 22 into the compartment 40.

After the compartment 40 has been filled with signatures 22, the carriage assembly 52 is moved rightwardly from the position indicated in dashed lines to the position indicated in solid lines in FIG. 6. This movement of the carriage assembly 52 positions the last compartment 42 of the container 24 at the loading station 34, as shown in FIG. 1. Operation of the loader assembly 28 is then effective to move a stack 30 of signatures into the compartment 42. Although it is preferred to fill the compartments 36, 38, 40 and 42 in that order, the compartments could be filled in any desired order. For example, the compartments 38 and 42 could be filled before the compartments 36 and 40 if desired.

While the fourth compartment 42 of the container 24 is being filled with signatures, the right or outfeed shuttle assembly 54 is extended. As the outfeed shuttle assembly 54 is extended, the carriage assembly 52 and shuttle assembly 54 move into an overlapping relationship relative to each other. When the outfeed shuttle assembly 54 is in the extended condition and the carriage assembly 52 is in the rightward position shown in solid lines in FIG. 6, a platform assembly 102 (FIG. 9) of the outfeed shuttle assembly 54 is disposed beneath the container supported on the carriage assembly 52. It should be noted that the platform assembly 102 has been removed from the outfeed shuttle assembly 54 in FIGS. 2 and 8 in order to expose motors connected with the platform assembly.

After the fourth compartment 42 of the container 24 has been filled, the platform assembly 102 (FIG. 9) on the outfeed shuttle assembly 54 is raised. Raising the platform assembly 102 lifts the filled container 24 off of the turntable 94 (FIGS. 6 and 7). The outfeed shuttle assembly 54 is then moved back to the retracted position shown in FIG. 9 to move the outfeed shuttle assembly 54 out of the overlapping relationship with the carriage assembly 52.

Figure 8:
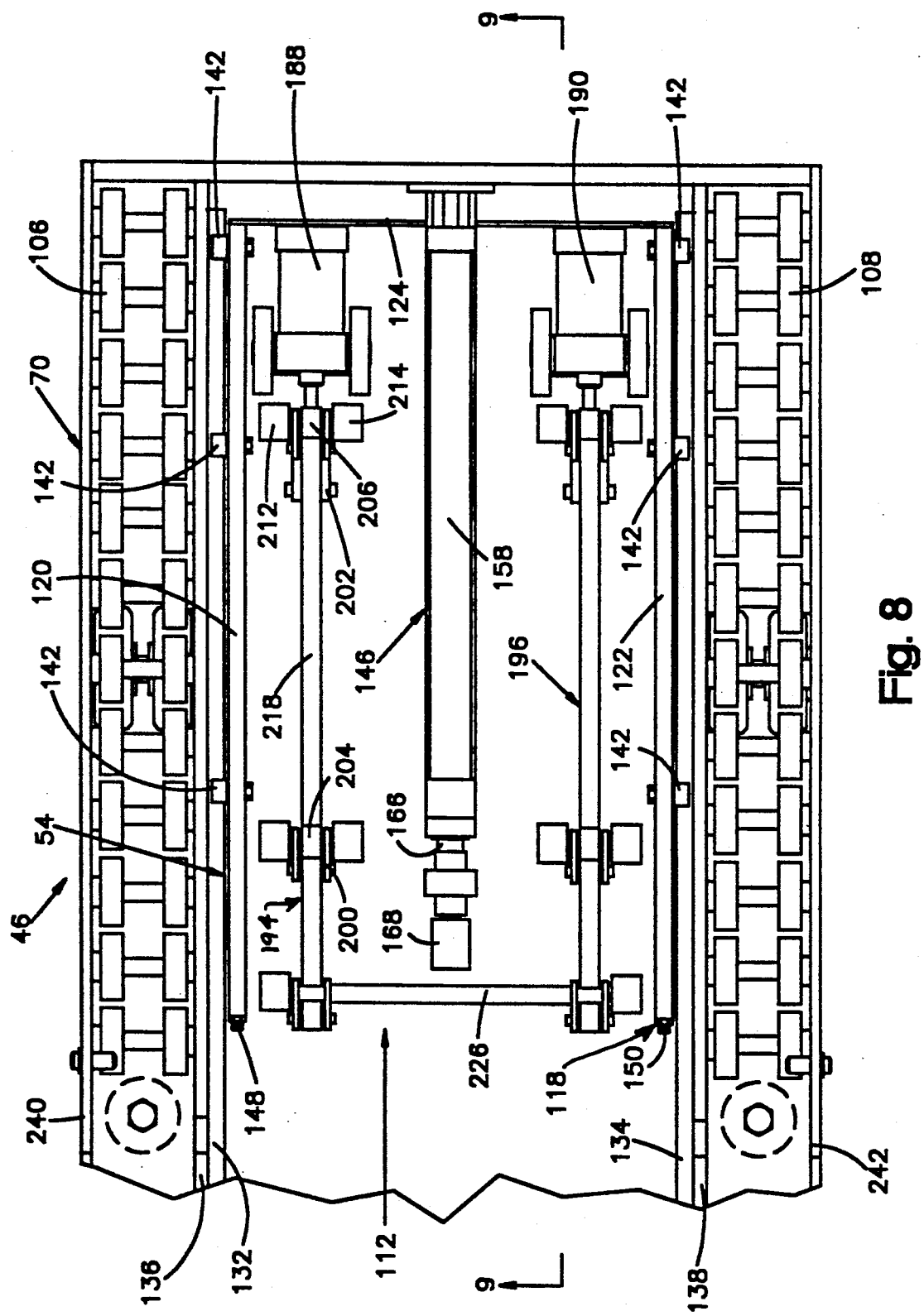
FIG. 8 is a plan view, taken generally along the line 8—8 of FIG. 3, illustrating the construction of an outfeed shuttle assembly, a platform assembly in the outfeed shuttle assembly having been removed in FIG. 8 to better illustrate the relationship between a shuttle drive motor and a pair of container support section lift motors.
Figure 9:
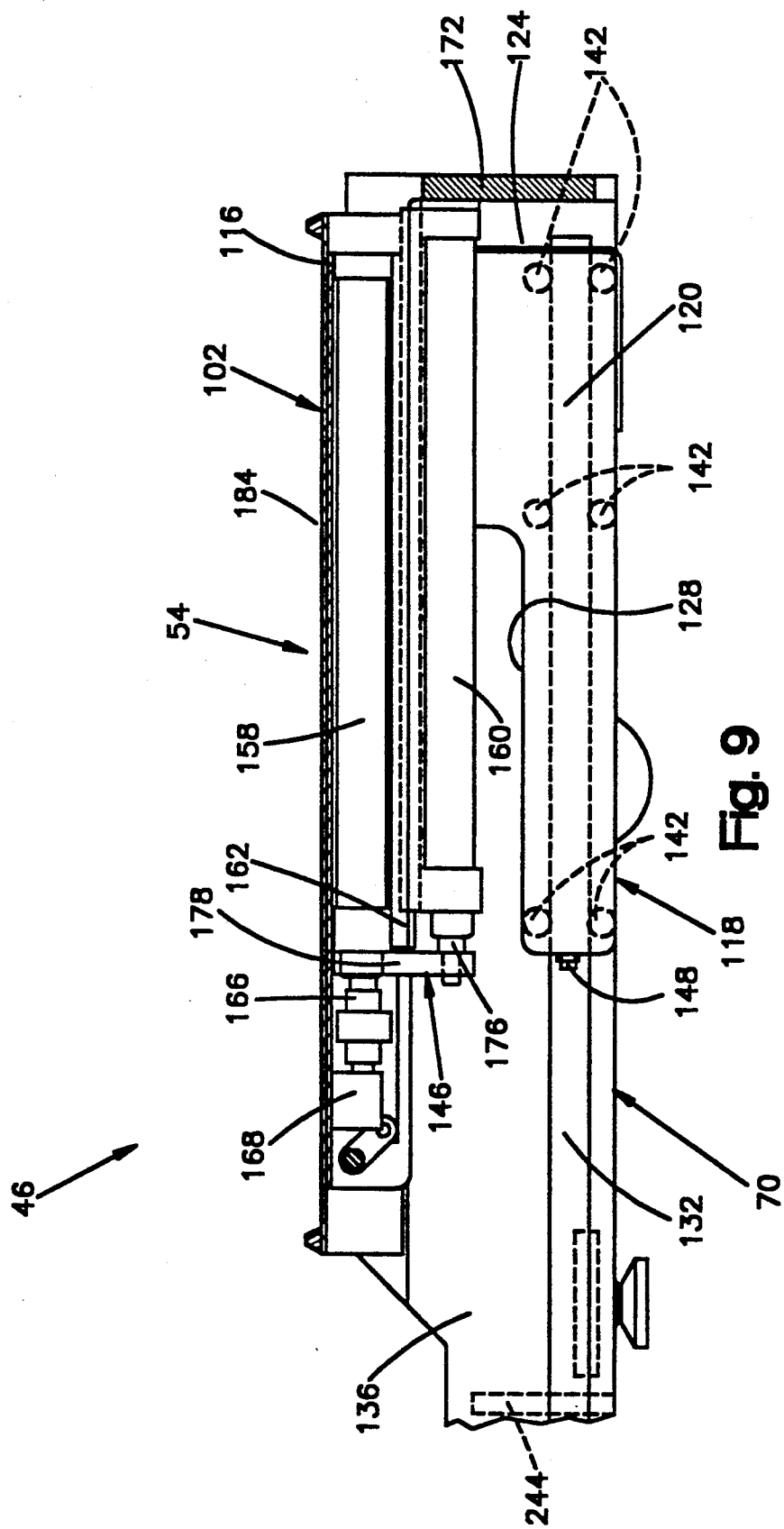
FIG. 9 is an elevational sectional view, taken generally along the line 9—9 of FIG. 8, with the platform assembly in place, illustrating the relationship between the shuttle drive motor assembly and the platform assembly.

When the outfeed shuttle assembly 54 has moved back to the retracted condition shown in FIG. 9, the filled container 24 is disposed over lower conveyor segments 106 and 108 (FIGS. 2 and 8). The platform assembly 102 (FIG. 9) of the outfeed shuttle assembly 54 is then lowered. This transfers the filled container 24 from the outfeed shuttle assembly 54 to the roller conveyor segments 106 and 108 (FIG. 8). The filled container 24 can be moved off of the roller conveyor segments 106 and 108 by a suitable conveyor assembly 110 and conveyed to a remote storage location. When the signatures or sheet material articles in the filled container 24 are needed to form a newspaper or magazine, the container is moved from the storage location and is emptied and the signatures in the container are collated with other signatures to form a newspaper or magazine.

Shuttle Assemblies

The infeed and outfeed shuttle assemblies 50 and 54 have the same construction and mode of operation. The infeed shuttle assembly 50 is movable from the retracted condition shown in FIG. 1 to an extended condition in which it is disposed in an overlapping relationship with the carriage assembly 52 when the carriage assembly 52 is at the left (as viewed in FIG. 1) end of stroke position in engagement with the stops 84 and 86. Similarly, the outfeed shuttle assembly 54 is movable from the retracted condition shown in FIG. 1 to an extended condition in which it is disposed in an overlapping relationship with the carriage assembly 52 when the carriage assembly is at a right end of stroke position (FIG. 1) in engagement with the stops 88 and 90 (FIG. 2).

Figure 10:
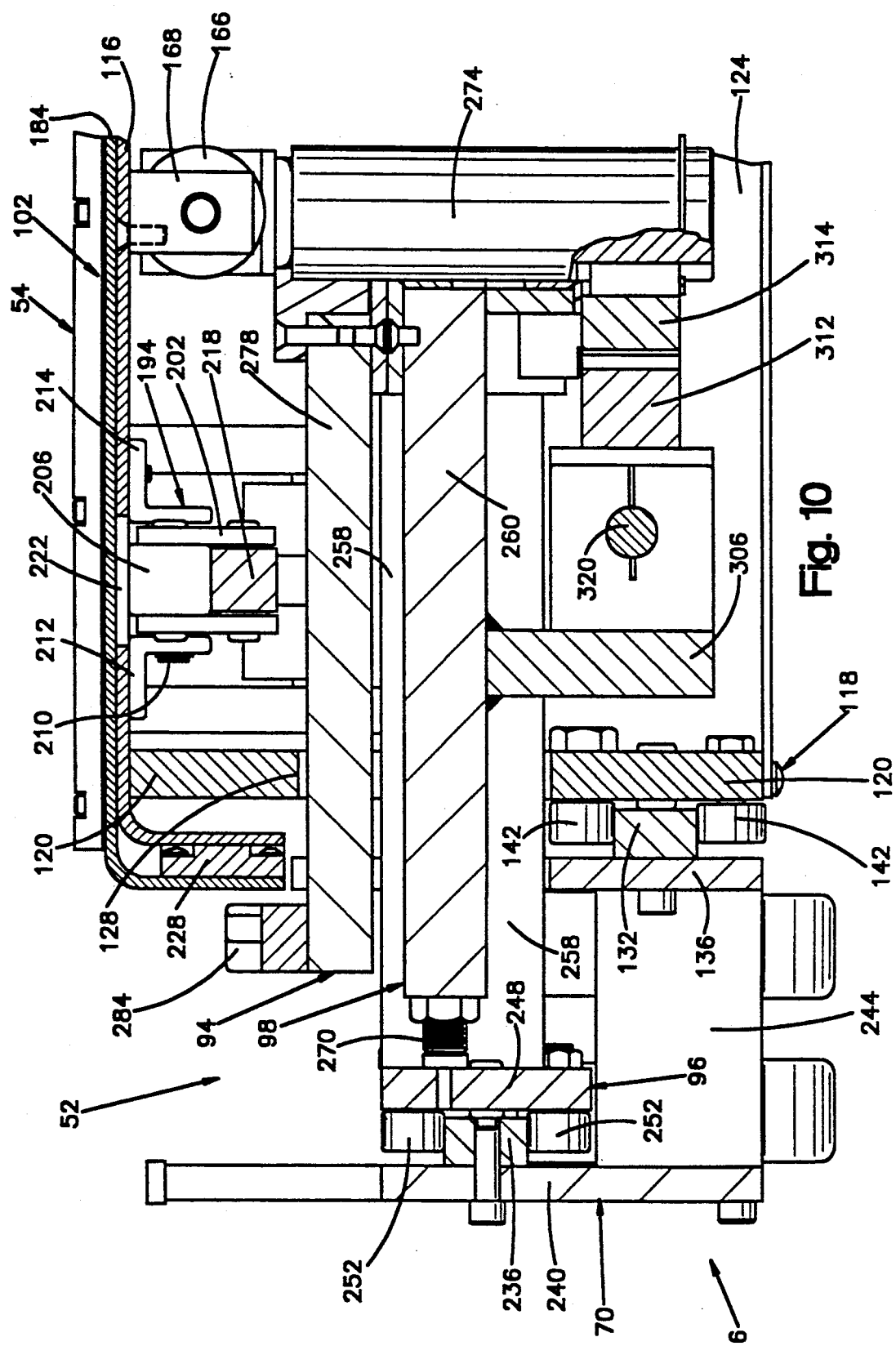
FIG. 10 is a fragmentary sectional view, taken generally along the line 10—10 of FIG. 6, illustrating the relationship between the outfeed shuttle assembly and the carriage assembly when the outfeed shuttle assembly and carriage assembly are in an overlapping relationship.

The outfeed shuttle assembly 54 includes a lift assembly 112 (FIG. 8) which is operable to move the platform assembly 102 (FIG. 9) between the lowered position shown in FIG. 9 and a raised position. The platform assembly 102 includes an inner or base section 116 (FIGS. 9, 10 and 11) which is fixedly connected with a generally U-shaped shuttle base section or frame 118 (FIG. 8). The shuttle base section or frame 118 includes a pair of parallel side plates 120 and 122 (FIG. 8) which are interconnected by an end plate 124. The side plates 120 and 122 are each provided with longitudinally extending slots 128 (FIG. 9) which receive the carriage assembly 52 when the outfeed shuttle assembly 54 and carriage assembly are in an overlapping relationship (FIG. 10).

Movement of the shuttle assembly 54 between the retracted and extended conditions is guided by a pair of linear tracks 132 and 134 (FIGS. 8 and 9) which are fixedly connected with parallel inner side plates 136 and 138 of the main frame 70 (FIGS. 8 and 9). A plurality of rollers 142 connected with the side plates 120 and 122 engage opposite sides of the tracks 132 and 134 (FIGS. 8 and 10). The tracks 132 and 134 also guide movement of the infeed shuttle assembly 50 between the extended and retracted positions. Therefore, the infeed shuttle assembly 50 and outfeed shuttle assembly 54 reciprocate along the same linear path relative to the main frame 70 of the container handling assembly 46.

A shuttle motor assembly 146 (FIGS. 8 and 9) is operable to move the base frame 118 of the outfeed shuttle assembly 54 from the retracted position shown in FIG. 8 to an extended position in which the shuttle assembly 54 is disposed in an overlapping relationship with the carriage assembly 52. When the shuttle assembly 54 is in the extended position, stop bolts 148 and 150 on the ends of the side plates 120 and 122 (FIG. 8) are disposed in abutting engagement with shuttle assembly stops 152 and 154 (FIG. 6). Similarly, when the infeed shuttle assembly 50 is in the extended position, the base frame of the shuttle assembly engages the stops 152 and 154.

The shuttle motor assembly 146 (FIG. 9) includes an upper motor cylinder 158. The upper motor cylinder 158 is slidably mounted on a lower motor cylinder 160 by a guide track 162. The piston rod 166 of the upper motor cylinder 158 is fixedly connected to the platform assembly 102 (FIG. 9) by a block 168. The lower motor cylinder 160 is fixedly connected with an end plate 172 of the main frame 70 and extends parallel to the upper motor cylinder 158. The piston rod 176 of the lower motor cylinder 160 is connected with the upper motor cylinder 158 by a connector section 178.

Upon operation of the lower motor cylinder 160 from the retracted condition shown in FIG. 9 to the extended condition, the piston rod 176 is extended toward the left. Leftward (as viewed in FIG. 9) movement of the piston rod 176 moves the upper motor cylinder 158 and the platform assembly 102 toward the left. Operation of the upper motor cylinder 158 from the retracted condition shown in FIG. 9 to the extended condition moves the piston rod 166 toward the left. This moves the platform assembly 102 leftwardly relative to both the upper motor cylinder 158 and the lower motor cylinder 160. Therefore, the platform assembly 102 is moved leftwardly from a retracted position to an extended position through a distance which equals the combined operating strokes of the upper and lower motor cylinders 158 and 160.

As the motor cylinders 158 and 160 are extended, the base frame 118 of the platform assembly 54 moves leftwardly until the stops 148 and 150 (FIG. 8) on the leading ends of the base section 118 engage the shuttle assembly stops 152 and 154 (FIG. 6). When the outfeed shuttle assembly 54 is in the extended position and the carriage 52 is in the rightward position shown in solid lines in FIG. 6, the outfeed shuttle assembly 54 and carriage 52 are in an overlapping relationship. At this time, the carriage assembly 52 extends through slots 128 (FIG. 9) in the opposite side plates 120 and 122 of the shuttle assembly base frame 118. Thus, the turntable 94, intermediate section 98 and base section 96, (FIG. 10) of the shuttle assembly 52 extend through the slots 128 in the side plate 120 of the shuttle base frame 118.

In the embodiment of the invention shown in FIG. 10, the platform assembly 102 is disposed above the carriage assembly 52. However, it is contemplated that at least a portion of the carriage assembly 52 could be disposed above the platform assembly 102 and when the carriage assembly and shuttle assembly 54 are in an overlapping relationship. Thus, if desired, the turntable 94 could be disposed above the platform assembly 102 when the carriage assembly 52 and shuttle assembly 54 are in an overlapping relationship. Of course, this would require clearance space, such as a slot in the platform assembly 102, in components of the shuttle assembly 54 for components of the carriage assembly 52.

Figure 11:
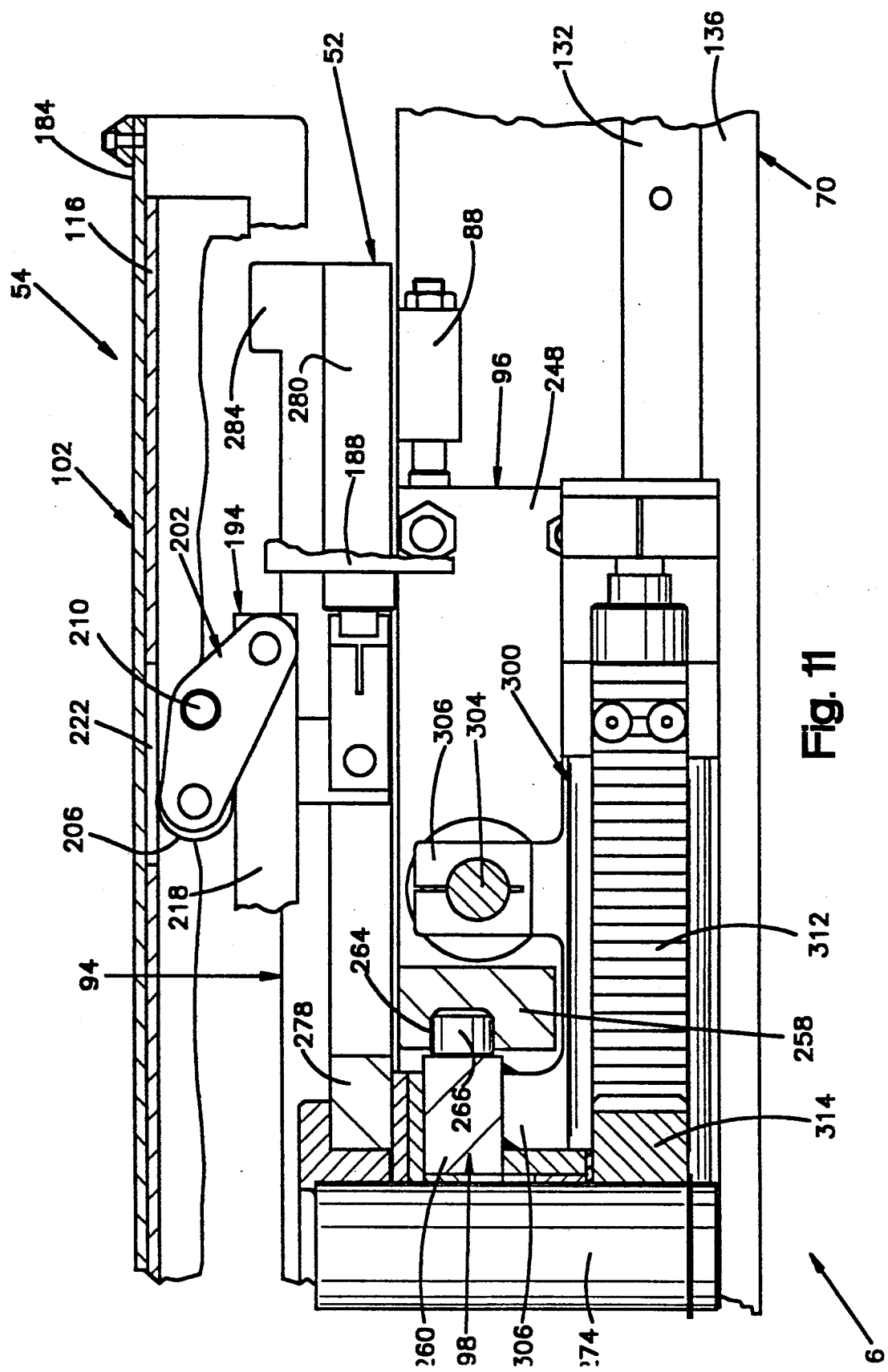
FIG. 11 is a fragmentary sectional view, taken generally along the line 11—11 of FIG. 6, further illustrating the relationship between the outfeed shuttle assembly and the carriage assembly when the outfeed shuttle assembly and carriage assembly are in an overlapping relationship.

The platform lift assembly 112 (FIG. 8) is operable to move an upper or container support section 184 of the platform assembly 102 upwardly relative to the base or inner support section 116 (FIGS. 9, 10 and 11). The platform lift assembly 112 includes a pair of lift motors 188 and 190 (FIG. 8). The lift motors 188 and 190 are fixedly connected with the inner or base section 116 (FIGS. 9 and 11) of the platform assembly 102.

The lift motors 188 and 190 are operable to actuate toggle lift assemblies 194 and 196 (FIGS. 8, 10 and 11) to raise the container support section 184 (FIGS. 10 and 11) of the platform assembly 102 relative to the base section 116 of the platform assembly. The toggle lift assembly 194 includes a pair of toggle arms 200 and 202 (FIG. 8). A pair of rollers 204 and 206 (FIGS. 8, 10 and 11) are mounted on upper end portions of the toggle arms 200 and 202. The toggle arms 200 and 202 are pivotally mounted on and movable with the base section 116 of the platform assembly 102 relative to the frame 70 upon operation of the shuttle assembly motor 146.

The toggle arm 202 is pivotally mounted on a support pin 210 (FIG. 11). The support pin 210 is connected with the base section 116 by a pair of mounting brackets 212 and 214 (FIG. 10). An actuator bar 218 (FIGS. 8, 10 and 11) is pivotally connected to the lower end portions of the toggle arms 200 and 202.

When the toggle motor 188 is operated from the retracted condition shown in FIGS. 8 and 11, the toggle actuator bar 218 is moved toward the left. Leftward movement of the toggle actuator bar 218 pivots the toggle arms 200 and 202. Pivoting the toggle arms 200 and 202 raises the rollers 204 and 206 through openings 222 (FIGS. 10 and 11) formed in the base section 116 of the platform assembly 102. Upward movement of the rollers 204 and 206 raises the container support section 184 of the platform assembly 102 upwardly relative to the base section.

Thus, the roller 206 (FIGS. 10 and 11) moves upwardly through the opening 222 formed in the base section 116 and engages the upper or container support section 184 of the platform assembly 122 during initial movement of the actuator bar 218. Continued movement of the actuator bar 218 causes the toggle arm 202 to continue to pivot in a clockwise direction (as viewed in FIG. 11) about the support pin 210 to lift the upper section 184 of the platform assembly 102 upwardly away from the lower or base section 116 of the platform assembly.

A guide block 228 connected with the container support section 184 (FIG. 10) is engaged by a pair of guide blocks connected with the inner support section 116 to guide upward movement of the container support section relative to the base section 116 of the platform assembly 102. Although only a single guide block 228 has been shown in FIG. 10, it should be understood that there are four guide blocks provided adjacent to the corners of the container support section 184. These four guide blocks cooperate with four pairs of guide blocks connected with the base section 116 adjacent to the corner portions of the base section.

When the toggle motor 188 is retracted, the actuator bar 218 is moved toward the right (as viewed in FIG. 8). This results in the toggle arm 222 pivoting in a counterclockwise direction (as viewed in FIG. 11) to move the toggle arm 202 from the raised position to the lowered position. The toggle arm 200 is pivoted in the same manner as the toggle arm 202 when the toggle motor 188 is retracted. As the toggle arms 200 and 202 are pivoted downwardly, the upper or container support section 184 of the platform assembly 102 moves downwardly into abutting engagement with the base section 116 of the platform assembly Although operation of only the toggle linkage assembly 194 associated with the motor 188 has been described herein, it should be understood that a similar toggle linkage 196 is associated with the motor 190 (FIG. 8). A tie rod or bar 226 (FIG. 8) extends between the two toggle linkage arrangements and interconnects them. The toggle motors 188 and 190 are simultaneously actuated to operate the toggle linkages 194 and 196 at the same time.

Although only the construction of the right or outfeed shuttle assembly 54 has been described in detail herein, it should be understood that the left or infeed shuttle assembly 50 (FIGS. 2 and 4) has the same construction and operates in the same manner as the outfeed shuttle assembly. Thus, the infeed shuttle assembly 50 includes a motor having the same construction as the shuttle motor 146. This motor is operable to move the infeed shuttle assembly 50 between the retracted position shown in FIGS. 1 and 2 and an extended position in which the infeed shuttle assembly is in an overlapping relationship with the carriage assembly 52.

The infeed shuttle assembly 50 also includes a lift assembly having the same construction as the lift assembly 112. The lift assembly in the infeed shuttle assembly 50 is operable to move an upper container support section of the platform assembly 80 relative to an inner or base section of the platform assembly 80. This is done in the same manner as in which the container support section 184 of the platform assembly 102 is moved relative to the base or inner section 116 of the platform assembly. Since the shuttle assemblies 50 and 54 have the same construction and mode of operation, either shuttle assembly can be used as the infeed shuttle assembly while the other shuttle assembly is used as the outfeed shuttle assembly.

Carriage Assembly

The carriage assembly 52 is operable to move a container 24 along a linear path and to rotate the container about a vertical axis which extends through the center of the container. The carriage assembly 52 (FIG. 6) includes the base section 96, the intermediate section 98 and a turntable 94 which is rotatably mounted on the intermediate section 98 (FIG. 7). The base section 96 (FIG. 6) is movable along linear guide tracks 236 and 238 connected with a pair of outer side plates 240 and 242 of the main frame 70. The inner side plates 136 and 138 are connected in a parallel relationship with the outer side plates 240 and 242 by spreader plates 244.

The base section 96 of the carriage assembly 52 includes a pair of parallel end plates 248 and 250 which are supported by rollers 252 (FIGS. 6 and 10) for movement along the tracks 236 and 238. A pair of parallel cross plates 256 and 258 (FIGS. 6, 7, 10 and 11) extend perpendicular to and interconnect the side plates 248 and 250. The cross plates 256 and 258 support the intermediate section 98 (FIGS. 6 and 7) for movement along a path extending perpendicular to the side plates 248 and 250 and the carriage tracks 236 and 238.

The intermediate section 98 has a rectangular body portion 260 (FIGS. 7, 10 and 11). The body portion 260 of the intermediate section 98 is supported for movement along tracks 262 and 264 (FIGS. 7 and 11) formed in the cross plates 256 and 258 of the base section 96 by rollers 266. A stop 270 (FIG. 6) connected to the side plate 248 limits movement of the intermediate section 98 toward the side plate 248. Similarly, a second stop (not shown) limits movement of the intermediate section 98 toward the side plate 250 when the turntable 94 has moved to the position shown in dash-dot lines in FIG. 6. Thus, movement of the intermediate section 98 in a direction perpendicular to the path of movement of the carriage assembly 52 along the tracks 236 and 238 is effective to move the turn table 94 from an inner position (shown in solid lines in FIG. 6) to an outer position (shown in dash-dot lines in FIG. 6) to provide space for the turntable 94 to rotate about its central axis.

The turntable 94 is rotatably supported on the intermediate section 98 by a cylindrical post 274 (FIGS. 6, 7, 10 and 11). The turntable 94 has a generally H-shaped configuration (FIG. 6) with the support post 274 extending through a center cross section 278 of the turntable 94. A pair of elongated parallel support sections 280 and 282 extend perpendicular to and are fixedly connected with the center cross section 278. Container positioning pads 284 are disposed at the four corners of the turntable 94 to engage recesses in the containers 24 to position the containers relative to the turntable.

A carriage motor 290 (FIGS. 4 and 5) includes a cylinder 292 which is fixedly connected to the main frame 70 (FIG. 4). The motor 290 includes a piston rod 294 (FIGS. 4, 6 and 7) which extends from the cylinder 292 to the base section 96 (FIGS. 6 and 7) of the carriage assembly 52. Thus, the piston rod 294 is connected to the cross plate 256 of the carriage base section 96.

When the carriage motor 290 is in the extended condition shown in FIGS. 4 and 6, the carriage assembly 52 is at a right (as viewed in FIG. 6) end of stroke position in which the base section 96 engages the carriage stops 88 and 90. At this time, the left (as viewed in FIG. 6) half of the turntable 94 is disposed at the loading station 34. Upon operation of the carriage motor 290 toward a retracted condition, the carriage assembly is moved along the tracks 236 and 238 to a left end of stroke position indicated in dashed lines in FIG. 6. At this time, the right (as viewed in FIG. 6) half of the turntable 94 is disposed at the loading station 34.

An empty container 24 is initially placed on the carriage assembly 52 when the carriage assembly is at the left end of stroke position, that is when the base section 96 is in engagement with the carriage stops 84 and 86 (FIG. 6). At this time, the first compartment 36 (FIG. 1) in the empty container is disposed at the loading station 34. Upon operation of the carriage motor 290 to the extended condition, the carriage assembly 52 is moved to the right end of stroke position, shown in solid lines in FIG. 6. At this time, the base section 96 of the carriage assembly 52 is disposed in engagement with the carriage stops 88 and 90 and the compartment 38 of the container 24 is disposed at the loading station 34.

After the compartments 36 and 38 of the container 24 have been filled with signatures 22, the container 24 is rotated about its vertical central axis. This is accomplished by rotating the turntable or container support section 94 of the carriage assembly 52 about the vertical central axis of the post 274.

Before the turntable 94 can be rotated, the intermediate section 98 of the carriage assembly 52 is moved away from the loader assembly 28 to provide room for the turntable 94 to rotate. This is accomplished by operating an intermediate section motor 300 (FIG. 6) to move the intermediate section 98 relative to the base section 96 of the carriage assembly 52. The intermediate section motor 300 includes a cylinder 302 which is fixedly connected to the side plate 250 of the carriage base section 96. A piston rod 304 of the intermediate section motor 300 is fixedly connected to a support plate 306 (FIG. 6) which is secured to the intermediate section 98.

Since the intermediate section motor 300 is connected with the intermediate section 98 and the base section 96, operation of the intermediate section motor moves the intermediate section 98 relative to the base section. Thus, when the intermediate section motor 300 is operated from the extended condition shown in FIG. 6 to a retracted condition, the piston rod 304 pulls the intermediate section 98 toward the side plate 250 of the base section 96. This moves the turntable 94 from the loading position shown in solid lines shown in FIG. 6 to the index position shown in dashed-dot lines.

Once the turntable section 94 has been moved outwardly away from the loader assembly 28 to the index position shown in dash-dot lines in FIG. 6, a turntable motor 310 is operated to move a rack gear 312 to rotate a pinion gear 314 (FIGS. 6, 7, 10 and 11). The turntable motor 310 includes a movable cylinder 318 (FIG. 6) which is fixedly connected with the rack gear 312. The cylinder 318 is movable relative to a piston rod 320 which is fixedly connected at opposite ends with the support plate 306.

Upon operation of the turntable motor 310, the cylinder 318 moves leftwardly from the position shown in FIG. 6 to a position adjacent to the opposite end of the piston rod 320. This movement of the cylinder 318 and rack gear 312 rotates the pinion gear 314 and turntable 94 in a counterclockwise direction (as viewed in FIG. 6). Upon operation of the turntable motor 310 in the opposite direction, the rack gear 312 is moved from left to right (as viewed in FIG. 6) to rotate the pinion gear 314 and turntable 94 in a clockwise direction. Each time the motor cylinder 318 and rack gear 312 move through an operating stroke, the pinion gear 314 and turntable 94 are rotated through 180° about a vertical axis extending through the center of the post 274 and a container disposed on the turntable 94.

In the illustrated embodiment of the invention, the turntable motor 310 is of the type in which a cylinder moves relative to a piston and piston rod during operation of the motor. If desired, the motor could be constructed so as to have the rack gear 312 connected with a piston rod which moves relative to a cylinder. In fact, it is contemplated that a pair of motors could be connected with the rack gear 312. If this was done, both of the motors would be operated simultaneously to effect rotation of the pinion gear 314.

Loader Assembly

The loader or stacker assembly 28 (FIG. 12) is provided with a plurality of platforms 224 which are mounted on an endless chain mechanism 226 trained around upper and lower sprockets 228 and 230. The chain mechanism 226 is positioned along an inclined front face 234 of the loader assembly 28 so that successive platforms 224 intercept signatures 22 from a signature conveyor 238. Operation of the chain mechanism 226 is timed to move the platforms 224 downwardly along the face 234 of the loader or stacker assembly 28 at the same rate at which the stack 30 of signatures on the upper front platform 224 grows. This keeps the top of the growing stack 30 of signatures at an intercept position registered with the conveyor assembly 238.

Whereas only three platforms 224 are shown attached to the chain 226, there are, in reality, several more, for instance three additional platforms, the exact number being a function of the stack height desired, the size of equipment and speed of operation of the system components. The spacing between platforms is the amount necessary to allow one stack to be built before interception of the flow of signatures by a following platform and start of a new stack.

Details of the stacking mechanism are disclosed in U.S. Pat. No. 4,401,021 and in U.S. Pat. No. 4,718,807. As disclosed in U.S. Pat. No. 4,401,021, a counter is arranged to count the number of signatures deposited on a platform 224. Interception of the flow of signatures from the conveyor 238 (FIG. 12) by each platform 224 is initiated when a predetermined desired number of signatures are positioned on the preceding platform.

The chain mechanism 226 is comprised of a pair of coextensive chains, and alternate platforms 224 are mounted on one chain or the other. The chains are independently movable. As one platform 224 is being loaded, the chain for the next platform is advanced so that this platform is poised for interception of the stream of signatures 22 from the conveyor assembly 238 when loading of the preceding platform is completed. Rapid activation of an intercepting platform 224 is achieved by pivotally mounting the platform on the respective chains. The platforms in the poised position are held in a raised spring-loaded mode by a latch which is adapted to release the platforms to the intercepting mode when loading of the preceding platform is completed. In this way, the continuous movement of the signatures can be maintained without interruption.

Figure 12:
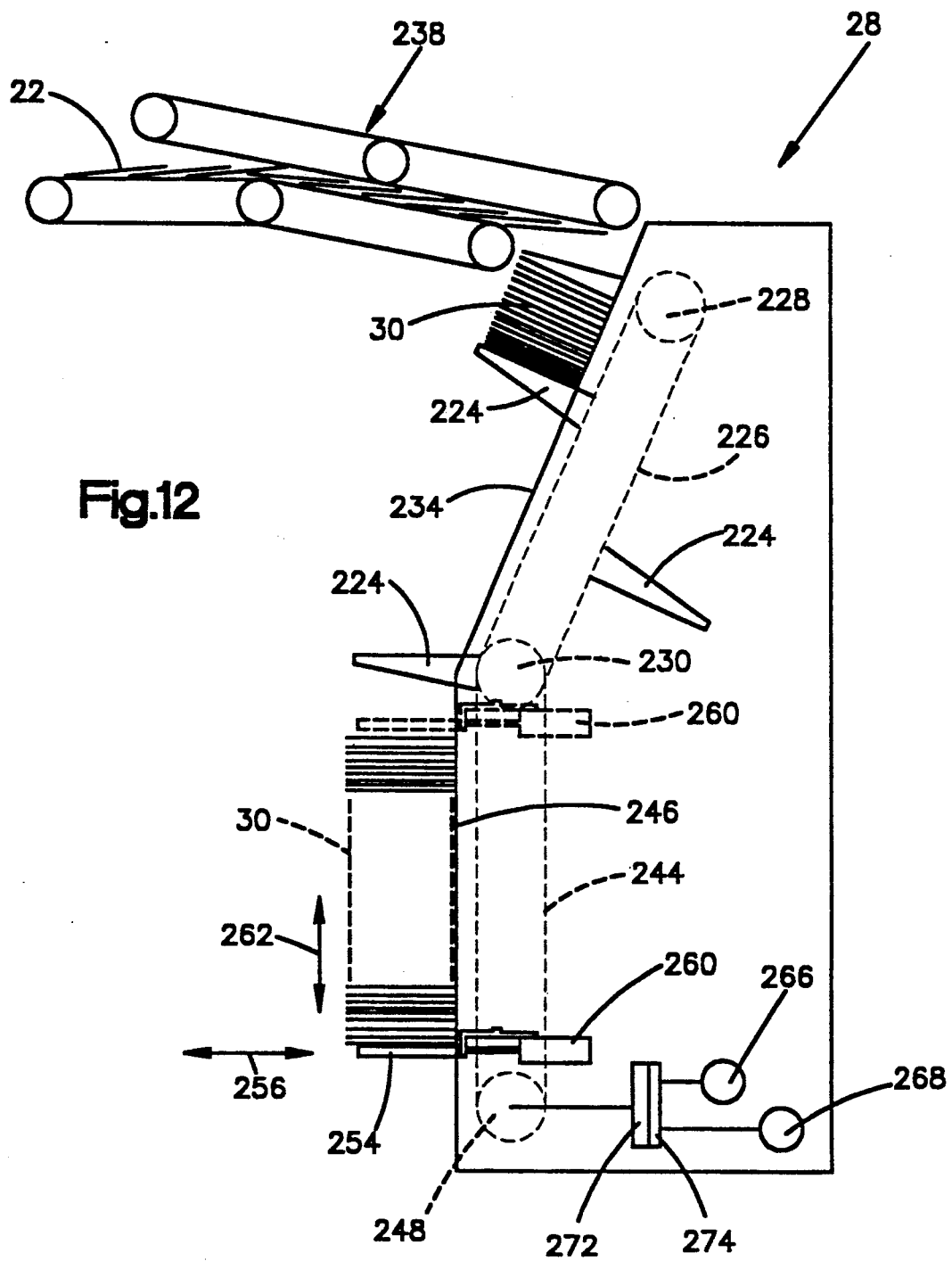
FIG. 12 is a schematic illustration of a loader or stacker assembly used in the apparatus of FIG. 1 to sequentially load stacks of sheet material articles into compartments of containers.

As shown in FIG. 12, the chain mechanism 226 and associated platforms 224 are substantially co-extensive with the inclined face 234 of the stacker assembly 28. A second chain mechanism 244 is provided below the chain mechanism 226. The second chain mechanism 244 is substantially co-extensive with a vertical lower face 246 of the stacker assembly 28. This chain mechanism is trained around a lower sprocket 248 and an upper sprocket (not shown) which is coaxial with and spaced from the sprocket 230.

Attached to the chain mechanism 244 is a fork 254. The fork 254 (FIG. 12) is adapted to be moved in and out from the face of the stacker assembly 28 in the direction of the arrows 256. The fork 254 is moved in and out by an actuator 260 which is moved up an down in the direction of the arrows 262 by the chain mechanism 244. The chain mechanism 244 is driven by reversible motors 266 and 268 coupled to the chain mechanism 244 through clutch and brake mechanisms 272 and 274. The motor 266 is operable to effect movement of the fork 254 downwardly at a first speed, which is greater than the speed of downward movement of the platforms 224 and stack 30. However, the motor 268 effects upward movement of the fork 254 after the fork has been retracted to deposit a stack 30 of signatures in a container, at a speed which is greater than the speed at which the fork 254 is moved downwardly.

In operation, the fork 254 is initially positioned at its uppermost point of travel which is adapted to be slightly above the lowermost point of travel of the platforms 224. The platforms 224 are configured to mesh with and pass by the fork 254 in their downward travel so that a stack of signatures on a platform 224 is transferred from the platform to the fork 254. The fork 254, upon receipt of stack of signatures, is lowered to its lowermost position, by the motor 266.

Initially, the stack 30 of signatures is reposed on an incline against the upper face 234 when transferred to the fork 254. During downward movement of the fork 254, the stack 30 is deflected into vertical repose by means of a deflecting surface at the point of juncture between the inclined face 234 and vertical face 246 of the stacker loader assembly 228. As the stack 30 begins to move straight downwardly, the loader fork 254 and stack 30 enter an empty compartment in a container 24 through the open upper end of the compartment. As the stack continues to move vertically downwardly, along the face 246 of the 10 loader assembly 28, the stack 30 moves vertically downwardly in a compartment of the container 24. As the stack 30 moves downwardly in the container compartment, the stack is supported by the loader fork 254 which extends through a vertical slot or opening in one side of the compartment.

When the stack 30 reaches the bottom of the compartment in the container 24, the fork 254 is withdrawn inwardly by the actuator 260 to a position in which the fork 254 is clear of the stack 30 and the container. Thus, the fork 254 is withdrawn to a position in which it is to the right (as viewed in FIG. 12) of the vertical side surface 246 of the loader assembly 28. Once the stack 30 has been deposited in a compartment of the container 24 and the fork 254 moved inwardly by the actuator 260, the motor 268 is connected with the chain mechanism 244 through the clutch and brake 272 and 274 to quickly move the fork upwardly to its upper end of stroke position.

Container

Each of the containers 24 (FIG. 1) includes four compartments 36, 38, 40 and 42 disposed in a rectangular array. The compartments 36 and 38 share a common vertical inner side wall 282. Similarly, the compartments 38 and 40 share a common vertical inner wall 284. The compartments 40 and 42 share a common vertical inner wall 288. Finally, the compartments 36 and 42 share a common vertical inner wall 290. The inner walls 282, 284, 288 and 290 intersect to form an X having its center at the center of the container 24.

The compartments 36 and 38 (FIG. 1) have elongated vertically extending openings 294 and 296 which face in the same direction and are disposed on one side of the container 24. Similarly, the compartments 40 and 42 have elongated vertically extending openings 298 and 300 which face in the opposite direction from the openings 294 and 296 and are disposed on the opposite side of the container 24. A pair of major outer side walls 304 and 306 form outer side walls of the compartments. Thus, the wall 304 forms an outer side wall of the compartments 36 and 42 while the outer wall 306 forms a side wall of the compartments 38 and 40.

A pair of planar or flange wall sections 308 and 310 extend inwardly on opposite vertical edge portions of the outer side wall 304 to partially define the openings 294 and 300 in opposite sides of the container. Similarly, a second pair of flange or minor wall sections 312 and 314 extend from opposite edge portions of the major wall 306 to partially define the openings 296 and 298. A pair of central secondary or minor side walls 318 and 320 extend from opposite sides of the inner walls 282 and 288 to further define the openings 294, 296, 298 and 300.

During loading of the container 24 with stacks 30 of sheet material articles or signatures 22, the loaded fork 254 (FIG. 12) moves vertically downwardly through each of the openings 294, 296, 298 and 300 (FIG. 1) in turn to lower a stack of sheet material articles into a compartment of the container. Slots are provided in the lower end portions of the container 24 to receive the fork 254 during loading of a stack of sheet material article into a compartment. Since the containers 24 are symmetrical on opposite sides of the inner walls 284 and 290, the containers can be positioned in the orientation shown in FIG. 1 or in an orientation offset 180° from the orientation shown in FIG. 1. However, regardless of the orientation of the containers, the compartment disposed where the compartment 36 is shown in FIG. 1 is filled first and the compartment disposed where the compartment 42 is shown in FIG. 1 is filled last.

Controls

Controls 324 (FIG. 13) for the container handling assembly 46 include valves for controlling the operation of the various motors in the container handling assembly. Thus, a control valve 328 (FIG. 13) is operable to effect simultaneous raising or lowering of the platform assemblies 80 and 102 (FIGS. 5 and 9) in the shuttle assemblies 50 and 54. When the control valve 328 is in the position shown in FIG. 13, the platform assemblies 80 and 102 are in their lowered condition. Thus, the right container support section lift motors 188 and 190

(FIG. 8) are in the illustrated retracted condition. Similarly, left container support section lift motors 330 and 332 (FIG. 13) are in their retracted condition.

Figure 13:
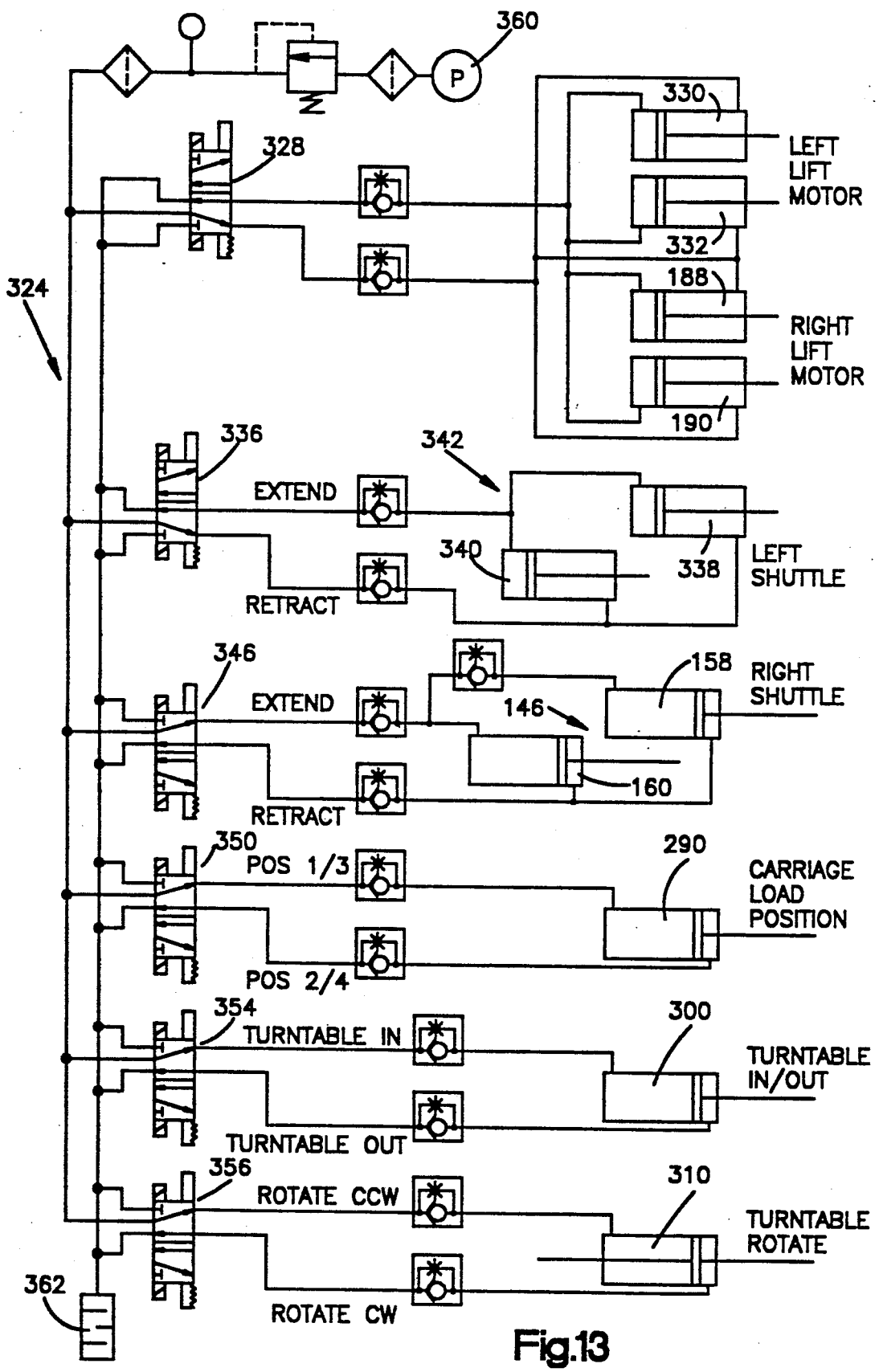
FIG. 13 is a schematic illustration of a control apparatus used in association with the container handling assembly of FIGS. 1-12.

When the controls 324 are in the condition shown in FIG. 13, both of the platform assemblies 80 and 102 (FIGS. 5 and 9) are lowered. Therefore, the shuttle assemblies 50 and 54 can be freely moved relative to containers disposed on the infeed roller conveyor segments 74 and 76, the carriage assembly 52 and/or outfeed roller conveyor segments 106 and 108 (FIG. 1). Actuation of the control valve 328 (FIG. 13) effects simultaneous operation of the motors 188, 190, 330 and 332 to simultaneously raise or lift the shuttle platform assemblies 80 and 102 to engage containers 24.

A control valve 336 is actuatable to effect movement of the left or infeed shuttle assembly 50 (FIGS. 1, 2 and 4) between the retracted and extended conditions. When the control valve 336 is in the position shown in FIG. 13, the left shuttle assembly 50 is retracted. Thus, at this time, upper and lower cylinders 338 and 340 of a left shuttle assembly motor 342 are retracted. Upon actuation of the control valve 336, the upper and lower cylinders 338 and 340 of the left shuttle motor 342 are extended to move the left shuttle assembly 50. The left shuttle assembly 50 is moved from the retracted condition shown in FIGS. 1 and 2 to an extended condition in which the left shuttle assembly is disposed in an overlapping relationship with the carriage assembly 52. The left shuttle assembly motor 342 has the same construction as the right shuttle assembly motor 146 (FIG. 9).

Similarly, operation of the right or outfeed shuttle assembly 54 between the extended and retracted conditions is controlled by actuation of a valve 346 (FIG. 13). When the valve 346 is in the condition shown in FIG. 13, the right shuttle motor assembly 146 is extended so that the right shuttle assembly 54 is in an overlapping relationship with the carriage assembly 52. Thus, the upper motor cylinder 158 and lower motor cylinder 160 (FIG. 9) are both extended as shown in FIG. 13.

Movement of the carriage assembly 52 between its left and right end of stroke positions is controlled by the valve 350. Thus, when the valve 350 is in the position shown in FIG. 13, the carriage motor 290 is extended to move the base section 96 of the carriage assembly 52 to the position shown in solid lines in FIG. 6. When the carriage assembly 52 is in this position, either the second or the fourth compartment 38 or 42 of a container 24 can be filled with sheet material articles.

When the valve 350 is operated from the actuated condition shown in FIG. 13, the carriage motor 290 is retracted to move the carriage assembly 52 to the position shown in dashed lines in FIG. 6. Upon actuation of the valve 350 from the position shown in FIG. 13, the carriage motor 290 is retracted to move the carriage assembly leftward to the position shown in dashed lines in FIG. 6. When the carriage assembly 52 is in this position, either the first or the third compartments 36 or 40 of the container 24 can be filled with sheet material articles.

Movement of the turntable 94 toward and away from the loader or stacker assembly 28 is controlled by actuation of a valve 354. When the valve 354 is in the position shown in FIG. 13, the turntable motor 300 (FIG. 6) is extended so that the turntable 94 is in or adjacent to the loader assembly 28. Upon actuation of the valve 354 from the position shown in FIG. 13, the intermediate section motor 300 is retracted to move the turntable 94 outwardly to the position indicated in dash-dot lines in FIG. 6.

A valve 356 is operable to rotate the turntable 94 through 180° in either a clockwise or counterclockwise direction relative to the base and intermediate sections 96 and 98 of the carriage assembly when the turntable 94 is in the out position, that is when the motor 300 is retracted. Actuation of the valve 356 from the position shown in FIG. 13 results in the turntable motor cylinder 318 and rack gear 312 (FIG. 6) being moved to rotate the turntable 94 in a clockwise direction (as viewed in FIG. 6). Upon subsequent operation of the valve 356 back to the position shown in FIG. 13, the motor 310 moves the rack gear 312 to rotate the turntable 94 in a counterclockwise direction (as viewed in FIG. 6).

The valves 328, 336, 346, 350, 354 and 356 (FIG. 13) are supplied with fluid under pressure, that is air, by- a pump 360. Air is exhausted to the atmosphere through a manifold 362. Although it is preferred to use air operated motors to actuate the container handling assembly 346, hydraulic motors could be used if desired.

Figure 14:
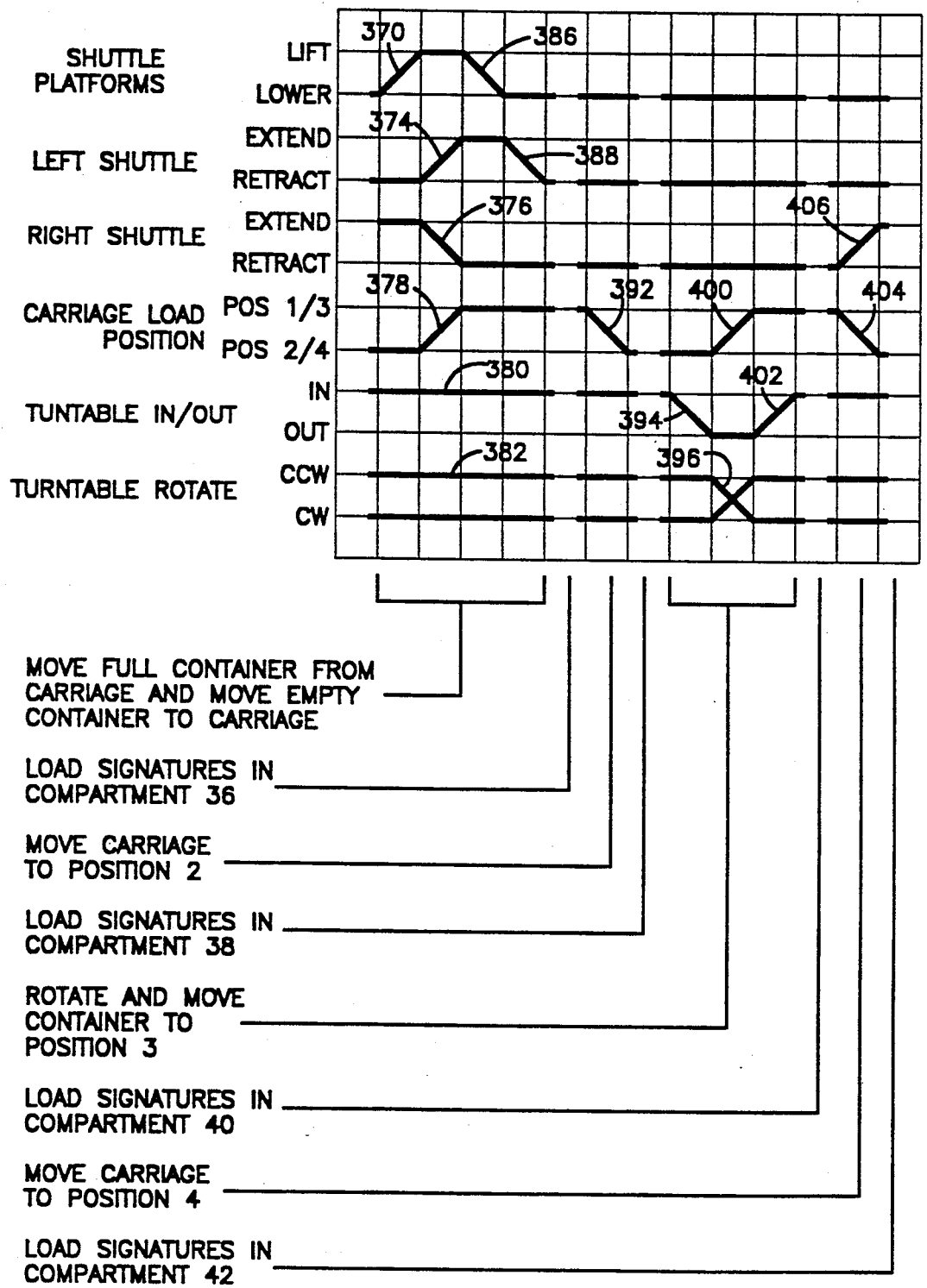
FIG. 14 is a chart depicting the sequence of operation of the various motors in the container handling assembly of FIGS. 1-12 by the control apparatus of FIG. 13.

An operating cycle of the container handling assembly 46 is illustrated schematically in FIG. 14. At the beginning of the cycle, as illustrated in FIG. 14, the valves 328, 336, 346, 350, 354 and 356 are in the positions shown in FIG. 13. Thus, at this time, the platform assemblies 80 and 102 are both in a lowered condition and the platform lift motors 188, 190, 330 and 332 (FIG. 13) are in their retracted condition.

At the beginning of the cycle, the left or infeed shuttle assembly 50 is in the retracted condition shown in FIGS. 1 and 4. Therefore, the upper and lower cylinders 338 and 340 of the shuttle motor assembly 342 are retracted. At this time, the platform assembly 80 of the left shuttle assembly 50 is disposed beneath an empty container 24 disposed on the roller conveyor segments 74 and 76 (FIG. 1).

At the beginning of the cycle, the right or outfeed shuttle assembly 54 is extended into an overlapping relationship with the carriage assembly 52. The upper and lower cylinders 158 and 160 of the shuttle motor assembly 146 are extended. Thus, the platform assembly 102 of the right shuttle assembly 54 is disposed beneath a filled or loaded container 24 disposed on the carriage assembly 52.

The intermediate section motor 300 of the carriage assembly 52 is extended. Therefore, the carriage assembly 52 is close to the loader assembly 28, in the position in which the last or fourth compartment 42 (FIG. 1) is filled with sheet material articles 22. Finally, the turntable motor cylinder 318 is disposed to the left of the position shown in FIG. 6.

Upon initiation of an operating cycle, the control valve 328 (FIG. 13) is operated to effect simultaneous raising of the platform assemblies 80 and 102 in the left and right shuttle assemblies 50 and 54, in the manner indicated by the line 370 in FIG. 14. Thus, the control valve 328 (FIG. 13) is actuated to port high pressure fluid to the head ends of the container support section lift motors 188, 190, 330 and 332. This effects a raising of the platform assembly 80 of the left shuttle assembly 50 to lift an empty container upwardly off of the infeed roller conveyor segments 74 and 76. At the same time, the platform assembly 102 of the right shuttle assembly 54 is raised to lift a filled container upwardly off of the carriage assembly 52.

In the next step of the operating cycle, the left shuttle assembly 50 is extended, in the manner indicated schematically by the line 374 in FIG. 14. This is accomplished by actuating the control valve 336 from the position shown in FIG. 13 to port high pressure fluid to the head ends of the motor cylinders 338 and 340.

As the shuttle assembly 54 is being extended to move an empty container over the carriage assembly 52, the right shuttle assembly 54 is being retracted. Retraction of the right shuttle assembly 54 moves a filled container from a position over the carriage assembly 52 to a position offset to one side of the carriage assembly, in the manner indicated schematically by the line 376 in FIG. 14. This is accomplished by operating the control valve 346 (FIG. 13) to port high pressure fluid to the rod ends of the motor cylinders 158 and 160. Therefore, as an empty container 24 is moved over the shuttle assembly 52, a filled container 54 is moved from the shuttle assembly 52 to a position over the outfeed roller conveyor segments 106 and 108 (FIG. 1).

As the left shuttle assembly 50 is being extended and the right shuttle assembly 54 is being retracted, the carriage assembly 52 is moved from a right end of stroke position to a left end of stroke position. Thus, the valve 350 (FIG. 13) is actuated to direct high pressure fluid to the rod end of the carriage motor 290. This results in the carriage motor 290 being retracted to move the carriage motor leftwardly from the position shown in solid lines in FIG. 6 to the position indicated in dashed lines in FIG. 6. Movement of the carriage assembly to the left end of stroke position is indicated schematically by the line 378 in FIG. 14.

During movement of an empty container 24 over the carriage assembly 52 and movement of a filled container off of the carriage assembly 52, the carriage assembly remains adjacent to the loader or stacker assembly 28 and the turntable 94 is not rotated, as indicated by the line segments 380 and 382 in FIG. 14. Thus, the control valves 354 and 356 remain in the position shown in FIG. 13.

During the next portion of the operating cycle, the platform assemblies 80 and 102 of the shuttle assemblies 50 and 54 are lowered, in the manner indicated by the line 386 in FIG. 14. This results in the empty container 24 being transferred to the carriage assembly 52 and in the loaded container being transferred to the roller conveyor outfeed segments 106 and 108. Lowering of the platform assemblies 80 and 102 is effected by actuating the valve 328 back to the position shown in FIG. 13.

Once the empty container has been transferred from the left or infeed shuttle assembly 50 to the carriage assembly 52, the left shuttle assembly is retracted, in the manner indicated schematically by the line 388 in FIG. 14. Retraction of the left shuttle assembly 50 is effected by actuating the control valve 336 back to the position shown in FIG. 13.

Once the left shuttle assembly 50 has been retracted, the loader assembly 28 is operated to load signatures or sheet material articles into the first compartment 36 of the container 24. During this time, the container handling assembly 46 remains stationary. The loader assembly 28 is operated to lower a stack 30 of signatures through the open upper end of the compartment 36. As this occurs, the loader fork 254 (FIG. 12) moves downwardly along the vertical slot or opening 294 (FIG. 1). The loader fork 254 is then withdrawn from the container 24 through the slot 294.

Once the first compartment 36 of the container 24 has been loaded with signatures, the carriage assembly 52 is moved rightwardly from the first loading position to the second loading position. Thus, the carriage assembly 52 is moved from the position indicated in dashed lines in FIG. 6 to the position indicated in solid lines, in the manner indicated schematically by the line 392 in FIG. 14. Rightward movement of the carriage assembly 52 to the position shown in solid lines in FIG. 6 is effected by actuating the control valve 350 to the position shown in FIG. 13.

Once the carriage assembly 52 has been moved to the second loading position, the second compartment 38 of the container 24 is at the loading station 34. The loader assembly 28 is then operated to fill the second compartment 38 of the container 24 with a stack 30 of the sheet material articles 22. Thus, the loader assembly 28 moves a stack of signatures downwardly through the open upper end of the compartment 38. As this occurs, the loader fork 254 (FIG. 12) moves downwardly along the vertical slot or opening 296 (FIG. 1). The loader fork 254 is then withdrawn from the container 24 through the slot 296.

After the compartment 38 of the container 24 has been filled with signatures, it is necessary to rotate the turntable 94 to position the compartments 40 and 42 adjacent to the loader assembly 28. In order to provide space for the turntable 94 to be rotated, the intermediate section 98 of the carriage assembly 52 is moved away from the loader assembly 28, in the manner indicated schematically- by the line 394 in FIG. 14. This moves the turntable 94 from the position shown in solid lines in FIG. 6 to the position shown in dash-dot lines in FIG. 6. Movement of the intermediate section 98 away from the loader assembly 28 is effected by actuating the control valve 354 (FIG. 13) to retract the intermediate section motor 300.

Once the turntable 94 has been moved away from the loader assembly 28, the turntable is rotated, in a clockwise direction, in the manner indicated schematically by the line 396 in FIG. 14. This is accomplished by actuating the control valve 356 from the position shown in FIG. 13. As the turntable 94 is rotated through 180° about a vertical axis, the half filled container 24 is rotated from a position in which the filled compartments 36 and 38 are adjacent to the loader assembly 28 to a position in which the empty compartments 40 and 42 are adjacent to the loader assembly.

As the turntable 94 and half filled container 24 are being rotated about their coincident vertical central axes, the carriage assembly 52 is moved toward the left to align the empty compartment 40 of the container 24 with the loading station 34. This leftward movement of the turntable 94 is indicated schematically- by the line 400 in FIG. 14. Leftward movement of the turntable 94 is effected by actuating the valve 350 to port high pressure fluid to the rod end of the carriage motor 290.

Once the turntable 94 has been rotated and moved to align the empty compartment 40 of the container 24 with the loading station 34, the intermediate section 98 of the carriage assembly 52 is moved toward the loader assembly 28 to position the empty compartment 40 at the loading station 34. This inward movement of the intermediate section 98 of the carriage assembly is indicated schematically by the line 402 in FIG. 14. Inward movement of the intermediate section 98 of the carriage assembly 52 is effected by actuating the control valve 354 to port high pressure fluid to the head end of the intermediate section motor 300.

Once the turntable 94 has been moved back to the position shown in dashed lines in FIG. 6, the compartment 40 of the container 24 is disposed at the loading station 34. The loader assembly 28 is then operated to lower a stack of signatures through the open upper end of the empty compartment 40. As this occurs, the loader fork 254 (FIG. 12) moves downwardly along the vertical slot or opening 298 (FIG. 1). The loader fork 254 is then withdrawn from the container 24 through the slot 298.

Once the compartment 40 has been filled with signatures, the carriage assembly 52 is moved from the position shown in dashed lines in FIG. 6 to the position shown in solid lines in FIG. 6. This moves the compartment 42 to the loading station 34. Movement of the carriage assembly 52 to the position shown in solid lines in FIG. 6 is indicated by the line 404 in FIG. 14. Movement of the carriage assembly 52 to the position shown in solid lines in FIG. 6 is effected by actuating the control valve 350 to the position shown in FIG. 13. This ports high pressure fluid to the head end of the carriage motor 290 to extend the carriage motor.

As the carriage assembly is being moved to the position shown in solid lines in FIG. 6, the lowered right shuttle assembly 54 is extended into an overlapping relationship with the carriage assembly This movement of the right shuttle assembly is indicated by the line 406 in FIG. 14. Operation of the right shuttle assembly 54 to the extended condition is effected by actuating the control valve 346 to the condition shown in FIG. 13. This ports high pressure fluid to the head ends of the motor cylinders 158 and 160.

Once the fourth and last compartment 42 of the container 24 has been moved to the loading station 34, the compartment is filled with a stack 30 of sheet material articles by the loader assembly 28. Thus, the loader assembly 28 moves a stack of signatures downwardly through the open upper end of the compartment 42. As this occurs, the loader fork 254 (FIG. 12) moves downwardly along the vertical slot or opening 300 (FIG. 1). The loader fork 254 is then withdrawn from the container 24 through the slot 300.

The operating cycle is then repeated to move the loaded container 24 off of the carriage assembly 52 and to move the next succeeding container onto the carriage assembly. The container handling assembly 46 is then operated to fill the empty compartments of this empty container in the manner previously explained.

Second Embodiment of the Invention

In the embodiment of the invention illustrated in FIG. 1, a single loader or stacker assembly 28 is provided in association with a single container handling assembly 46 to sequentially load sheet material articles into a plurality of compartments in each of a plurality of containers 24. In the embodiment of tho invention illustrated in FIG. 15, a plurality of loader or stacker assemblies are associated with a plurality of container handling assemblies to sequentially load sheet material articles to a plurality of containers. Since the apparatus illustrated in FIG. 15 is generally similar to the apparatus illustrated in FIGS. 1-14, similar numerals will be utilized to designate similar components, the suffix letter "a" being associated with the numerals of FIG. 15 to avoid confusion.

The apparatus 20a for sequentially loading sheet material articles into a plurality of compartments 36a, 38a, 40a, and 42a of a container 24a includes a pair of loader or stacker assemblies 28a. A pair of container handling assemblies 46a have the same construction and mode of operation as the container handling assembly 46 of FIGS. 1-14. An empty container infeed conveyor 412 is operable to move empty containers 24a to each of the loader assemblies 28a in turn. An outfeed conveyor assembly 414 is provided to move the filled containers 24a away from the container handling apparatus 46a.

Figure 15:
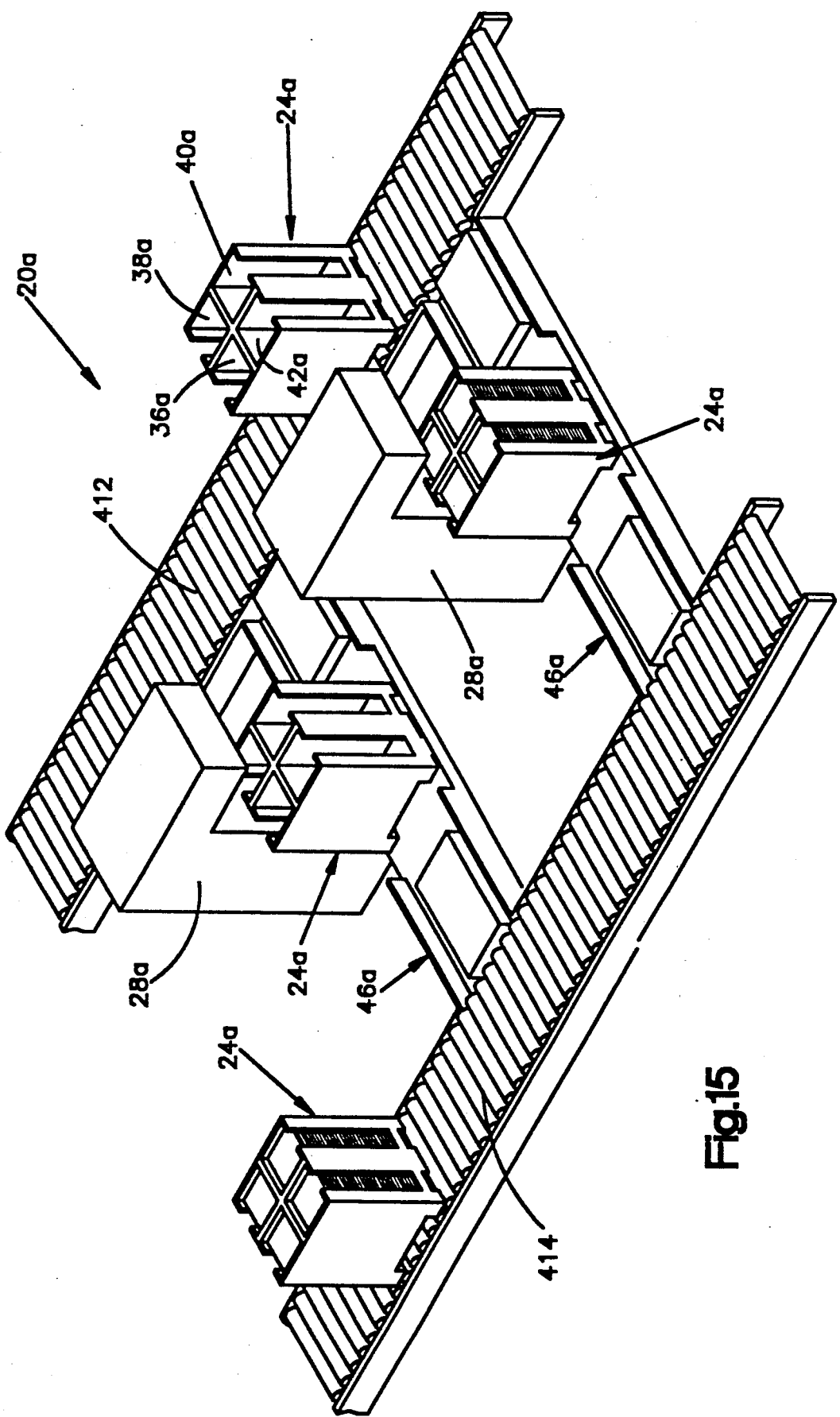
FIG. 15 is a pictorial illustration of an embodiment of the invention in which a pair of loader assemblies are associated with a pair of container handling assemblies.

Although only a pair of loader assemblies 28a have been shown in association with infeed and outfeed conveyors 412 and 414 in FIG. 15, it should be understood that as many loader assemblies 28a as desired could be provided. Of course, a separate container handling assembly 46a would be associated with each of the loader assemblies 28a. Although one particular relationship between the infeed conveyor 412 and outfeed conveyor 414 and the container handling assemblies 46a has been shown in FIG. 15, it should be understood that any desired arrangement of loader assemblies 28a and container handling assemblies 46a could be provided to sequentially load containers 24a with sheet material articles.

Conclusion

The present invention provides a new and improved apparatus 20 and method for sequentially loading sheet material articles 22 into a plurality of compartments 36, 38, 40 and 42 in each of a plurality of containers 24. To load an empty container 24, the container is moved to a first or infeed shuttle assembly 50. The empty container 24 is transferred from the infeed shuttle assembly 50 to a carriage assembly 52. The transfer of the empty container from the infeed shuttle assembly 50 to the carriage assembly 52 may be accomplished by moving the shuttle assembly and carriage assembly into an overlapping relationship. The infeed shuttle assembly 50 and carriage assembly 52 may then be moved vertically relative to each other to transfer the empty container 24 from the shuttle assembly to the carriage assembly.

Once the empty container 24 has been transferred from the infeed shuttle assembly 50 to the carriage assembly 52, each of the compartments 36, 38, 40 and 42 in the empty container is filled in turn with sheet material articles 22 while the container is supported by the carriage assembly. The carriage assembly 52 is movable relative to a loader or stacker assembly 28 to sequentially position the compartments of the container 24 at a loading station 34. In order to position the empty compartments 36, 38, 40 and 42 of the container 24 at the loading station 34, the carriage assembly 52 may advantageously be operated to move the empty container along a linear path and to rotate the container about a vertical axis.

Once the various compartments 36, 38, 40 and 42 in the container 24 have been loaded with sheet material articles, the container 24 is transferred from the carriage assembly 52 to a second or outfeed shuttle assembly 54. This may be accomplished by moving the outfeed shuttle assembly 54 into an overlapping relationship with the carriage assembly 52 and providing relative vertical movement between the loaded container 24 and the outfeed shuttle assembly. The carriage assembly 52 and outfeed shuttle assembly 54 are then moved out of the overlapping relationship with each other while the container 24 is supported by the outfeed shuttle assembly.

Having described a preferred embodiment of the invention, the following is claimed:

1. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said carriage means including a container support section having surface means for engaging a container and drive means for rotating said container support section about a vertical axis to at least partially move a container disposed on said container support section from a first position in which a first compartment of the container is at the loading station to a second position in which a second compartment of the container is at the loading station.

2. An apparatus as set forth in claim 1 wherein said carriage means includes drive means for moving said container support section along a linear path to at least partially move a container disposed on said container support section from a first position in which a first compartment of the container is at the loading station to a second position in which a second compartment of the container is at the loading station.

3. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said carriage means including a container support section having surface means for engaging a container, first drive means for rotating said container support section about a vertical axis to rotate a container disposed on said container support section relative to said loader means and second drive means for moving said container support section along a linear path to move a container disposed on said container support section relative to said loader means.

4. An apparatus as set forth in claim 3 wherein said first shuttle means and said second shuttle means are operable to move containers along linear paths extending parallel to the linear path along which said second drive means moves said container support section.

5. An apparatus as set forth in claim 3 wherein said first shuttle means and said second shuttle means are operable to move containers along linear paths extending transversely to the linear path along which said second drive means moves said container support section.

6. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said carriage means including a container support section having surface means for engaging a container, first drive means for moving said container support section along a first linear path between a position in which a first compartment of a container on said container support section is at the loading station and a position in which a second compartment of the container on said container support section is at the loading station, second drive means for moving said container support section along a second linear path which extends transversely to the first linear path to move said container support section away from said loader means to an indexing station, and third drive means for rotating said container support section at the indexing station to move the container on said container support section from a position in which the first and second compartments of the container on said container support section are toward said loader means to a position in which third and fourth compartments of the container on said container support section are toward said loader means, said second drive means being operable to move said container support section along the second linear path toward said loader means to at least partially move the third compartment of the container on said container support section to the loading station, said first drive means being operable to move said container support section along the first linear path to move the third compartment of the container on said container support section from the loading station and to move the fourth compartment of the container on said container support section to the loading station.

7. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said carriage means including a base section movable relative to said loader means along a first linear path, first drive means for moving said base section along the first linear path, an intermediate section connected with said base section for movement therewith along the first linear path, said intermediate section being movable relative to said base section along a second linear path which extends transversely to the first linear path, second drive means for moving said intermediate section along the second linear path, a turntable section connected with said intermediate section for movement therewith along the first and second linear paths, said turntable section being rotatable relative to said intermediate section about a vertical axis, and third drive means for rotating said turntable section about the vertical axis.

8. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said carriage means includes a container support section having surface means for engaging a container, first drive means for moving said container support section toward and away from said loader means between the loading station and an indexing station, and second drive means for rotating said container support section about a vertical axis when the container support section is at the indexing station.

9. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said first shuttle means and said carriage means being movable relative to each other between a first condition in which said first shuttle means is offset to one side of said carriage means and a second condition in which said first shuttle means overlaps said carriage means to enable said first shuttle means to support an empty container over said carriage means, said first shuttle means and said carriage means being vertically movable relative to each other when they are in the second condition to transfer an empty container from said first shuttle means to said carriage means.

10. An apparatus as set forth in claim 9 wherein said second shuttle means and said carriage means are movable relative to each other between a first condition in which said second shuttle means is offset to a side of said carriage means opposite from said one side and a second condition in which said carriage means overlaps said second shuttle means to enable said carriage means to support a container having compartments loaded with sheet material over said second shuttle means, said second shuttle means and said carriage means being vertically movable relative to each other when they are in the second condition to transfer a container loaded with sheet material articles from said carriage means to said second shuttle means.

11. An apparatus as set forth in claim 10 wherein said first shuttle means includes first drive means for moving said first shuttle means relative to said carriage means along a linear path, said second shuttle means including second drive means for moving said second shuttle means relative to said second carriage means along the linear path.

12. An apparatus as set forth in claim 10 wherein said carriage means includes drive means for moving said carriage means along a linear path relative to said first and second shuttle means.

13. An apparatus as set forth in claim 10 wherein said first shuttle means is movable along a linear path relative to said carriage means, said carriage means is movable along the linear path relative to said first and second shuttle means, and said second shuttle means is movable along the linear path relative to said carriage means.

14. An apparatus as set forth in claim 10 wherein said carriage means includes first surface means for engaging a container, said first shuttle means including second surface means for engaging a container and means for lowering said second surface means relative to said first surface means when said first shuttle means and said carriage means are in the second condition to transfer an empty container from said second surface means to said first surface means, said second shuttle means including third surface means for engaging a container and means for raising said third surface means relative to said first surface means when said second shuttle means and said carriage means are in the second condition to transfer a container loaded with sheet material from said first surface means to said third surface means.

15. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said first shuttle means including a first movable base section, a first support section connected with said first base section and movable relative to said first base section between a raised position and a lowered position, first support section drive means for moving said first support section between the raised and lowered positions, and first shuttle drive means for moving said first base section from a retracted position offset to one side of said carriage means to an extended position in which said first support section is in an overlapping relationship with said carriage means, said first shuttle drive means being operable to move said first base section from the retracted position to the extended position with said first support section in the raised position and with an empty container on said first support section, said first support section drive means being operable to move said first support section from the raised position to the lowered position with said first base section in the extended position to transfer an empty container from said first support section to said carriage means, said first shuttle drive means being operable to move said first base section from the extended position to the retracted position with said first support section in the lowered position.

16. An apparatus as set forth in claim 15 wherein said second shuttle means includes a second movable base section, a second support section connected with said second base section and movable relative to said second base section between a raised position and a lowered position, second support section drive means for moving said second support section between the raised and lowered positions, and second shuttle drive means for moving said second base section from a retracted position offset to a side of said carriage means opposite from the one side to an extended position in which said second support section is in an overlapping relationship with said carriage means, said second shuttle drive means being operable to move said second base section from the retracted position to the extended position with said second support section in the lowered position, said second support section drive means being operable to move said second support section from the lowered position to the raised position with said second base section in the extended position to transfer a container loaded with sheet material from said carriage means to said second support section, said second shuttle drive means being operable to move said second base section from the extended position to the retracted position with said second support section in the raised position and with the container loaded with sheet material on said second support section.

17. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, and second shuttle means disposed adjacent to a second side of said carriage means for sequentially transferring containers having compartments loaded with sheet material articles from said carriage means, said carriage means including motor means for moving said carriage means along a linear path between a first end of stroke position in which said carriage means is adjacent to said first shuttle means and a second end of stroke position in which said carriage means is adjacent to said second shuttle means, said first shuttle means being movable between a retracted condition in which said first shuttle means is offset to one side of said carriage means when said carriage means is in the first end of stroke position and an extended condition in which said first shuttle means and carriage means are disposed in an overlapping relationship when said carriage means is in said first end of stroke position, said second shuttle means being movable between a retracted condition in which said second shuttle means is offset to a side of said carriage means opposite from said one side when said carriage means is in the second end of stroke position and an extended condition in which said second shuttle means and carriage means are disposed in an overlapping relationship when said carriage means is in said second end of stroke position.

18. An apparatus as set forth in claim 17 wherein said carriage means includes a first end portion which is adjacent to said first shuttle means when said carriage means is at the first end of stroke position and a second end portion which is adjacent to said second shuttle means when said carriage means is at the second end of stroke position, said second end portion of said carriage means being disposed at the loading station when said carriage means is at the first end of stroke position, said first end portion of said carriage means being disposed at the loading station when said carriage means is at the second end of stroke position.

19. An apparatus as set forth in claim 17 wherein said first shuttle means includes surface means for at least partially defining a first slot into which said carriage means extends when said first shuttle means is in the extended condition and said carriage means is at the first end of stroke position, said second shuttle means including surface means for at least partially defining a second slot into which said carriage means extends when said second shuttle means is in the extended condition and said carriage means is at the second end of stroke position.

20. An apparatus as set forth in claim 17 wherein said carriage means includes motor means for rotating at least a portion of said carriage means about a vertical axis when said first and second shuttle means are in their retracted conditions.

21. An apparatus for use in sequentially loading sheet material articles into a plurality of compartments in each of a plurality of containers, said apparatus comprising loader means for moving sheet material into each of the plurality of compartments in each of the containers in turn while each compartment of the containers is disposed at a loading station, carriage means for moving a container between a first position in which a first compartment of the container is at the loading station and a second position in which a second compartment of the container is at the loading station, first shuttle means disposed adjacent to a first side of said carriage means for sequentially transferring containers having empty compartments to said carriage means, said first shuttle means and said carriage means being movable from an offset relationship to an overlapping relationship to facilitate the transfer of a container from said first shuttle means to said carriage means, and second shuttle means disposed adjacent to a second side of said carriage means for sequentially transferring containers having compartments loaded with sheet material articles from said carriage means, said second shuttle means and said carriage means being movable from an overlapping relationship to an offset relationship to facilitate the transfer of a container from said carriage means to said second shuttle means.

22. An apparatus as set forth in claim 21 wherein said carriage means is operable to rotate a container disposed on said carriage means about a vertical axis to change the orientation of the container relative to said loader means.

23. An apparatus as set forth in claim 21 wherein at least a portion of one of said carriage means and first shuttle means is vertically movable relative to the other of said carriage means and first shuttle means when said carriage means and first shuttle means are in the overlapping relationship to transfer a container from said first shuttle means to said carriage means.

24. An apparatus as set forth in claim 23 wherein at least a portion of one of said carriage means and second shuttle means is vertically movable relative to the other of said carriage means and second shuttle means when said carriage means and second shuttle means are in the overlapping relationship to transfer a container from said carriage means to said second shuttle means.

25. An apparatus as set forth in claim 21 wherein said first shuttle means overlaps said carriage means when said first shuttle means and carriage means are in the overlapping relationship and wherein said second shuttle means overlaps said carriage means when said second shuttle means and carriage means are in the overlapping relationship.

26. An apparatus as set forth in claim 21 wherein said first shuttle means includes a first container support section for supporting an empty container and first motor means for reciprocating said first container support section along a linear path between a position in which said first container support section is offset to a first side of said carriage means when said first shuttle means and said carriage means are in the offset relationship and a position in which said first container support section and said carriage means are at least partially overlapping when said first shuttle means and said carriage means are in the overlapping relationship.

27. An apparatus as set forth in claim 26 wherein said second shuttle means includes a second container support section for supporting a loader container and second motor means for reciprocating said second container support section along the same linear path that said first motor means reciprocates said first container support section, said second motor means being operable to move said second container support section along the linear path between a position in which said second container support section is offset to a second side of said carriage means opposite from the first side when said second shuttle means and said carriage means are in the offset relationship and a position in which said container support section and said carriage means are at least partially overlapping when said first shuttle means and said carriage means are in the overlapping relationship.

28. An apparatus as set forth in claim 27 wherein said carriage means includes means for rotating a container about a vertical axis when said first container support section is offset to the first side of said carriage means and said second container support section is offset to the second side of said carriage means.

29. An apparatus as set forth in claim 27 wherein said first container support section overlaps said carriage means when said first container support section and said carriage means are at least partially overlapping and wherein said second container support section overlaps said carriage means when said second container support section and said carriage means are at least partially overlapping.

30. An apparatus for use in sequentially handling containers having compartments for sheet material articles, said apparatus comprising sheet material handling means for moving sheet material relative to compartments of the containers when the containers are at a work station, carriage means for engaging a bottom portion of each of the containers in turn to support each of the containers at the work station, first shuttle means disposed adjacent to a first side of said carriage means for sequentially transferring containers to said carriage means, and second shuttle means disposed adjacent a second side of said carriage means for sequentially transferring containers from said carriage means, said carriage means including means for rotating a container disposed on said carriage means about a vertical axis to change the orientation of the container relative to said sheet material handling means.

31. An apparatus as set forth in claim 30 wherein said carriage means includes means for moving a container away from said sheet material handling means along a linear path to an indexing station and for moving the container along the linear path toward the sheet material handling means from the indexing station, said carriage means being operable to rotate the container about a vertical axis while the container is at the indexing station.

32. An apparatus as set forth in claim 30 wherein said carriage means includes a container support section having surface means for engaging a container, said means for rotating a container including first drive means for rotating said container support section about a vertical axis to rotate a container disposed on said container support section relative to said sheet material handling means.

33. An apparatus as set forth in claim 30 wherein said carriage means includes a container support section having surface means for engaging a container, and first drive means for moving said container support section along a first linear path to move said container support section away from said sheet material handling means to an indexing station, said means for rotating a container including second drive means for rotating said container support section at the indexing station to move the container on said container support section from a first orientation in which first and second compartments of the container on said container support section are toward said sheet material handling means to a second orientation in which third and fourth compartments of the container on said container support section are toward said sheet material handling means, said first drive means being operable to move said container support section along the first linear path toward said sheet material handling means with the container in the second orientation.

34. An apparatus as set forth in claim 30 wherein said carriage means includes a base section movable relative to said sheet material handling means along a first linear path, first drive means for moving said base section along the first linear path, an intermediate section connected with said base section for movement therewith along the first linear path, said intermediate section being movable relative to said base section along a second linear path which extends transversely to the first linear path, second drive means for moving said intermediate section along the second linear path, and a turntable section connected with said intermediate section for movement therewith along the first and second linear paths, said turntable section being rotatable relative to said intermediate section about a vertical axis, said means for rotating a container including third drive means for rotating said turntable section about the vertical axis.

35. An apparatus as set forth in claim 30 wherein said carriage means includes a container support section having surface means for engaging a container, first drive means for moving said container support section toward and away from said sheet material handling means between the work station and an indexing station, said means for rotating a container including second drive means for rotating said container support section about a vertical axis when the container support section is at the indexing station.

36. An apparatus as set forth in claim 30 wherein said first shuttle means and said carriage means are movable relative to each other between a first condition in which said first shuttle means is offset to one side of said carriage means and a second condition in which said first shuttle means and said carriage means are in an overlapping relationship in which said first shuttle means supports a container, said first shuttle means and said carriage means being vertically movable relative to each other when they are in the second condition to transfer a container from said first shuttle means to said carriage means.

37. An apparatus as set forth in claim 36 wherein said second shuttle means and said carriage means are movable relative to each other between a first condition in which said second shuttle means is offset to a side of said carriage means opposite from said one side and a second condition in which said carriage means and said second shuttle means are in an overlapping relationship in which said carriage means supports a container, said second shuttle means and said carriage means being vertically movable relative to each other when they are in the second condition to transfer a container from said carriage means to said second shuttle means.

38. An apparatus as set forth in claim 37 wherein said first shuttle means includes first drive means for moving said first shuttle means relative to said carriage means along a first linear path, said second shuttle means including second drive means for moving said second shuttle means relative to said second carriage means along the first linear path.

39. An apparatus as set forth in claim 37 wherein said carriage means includes drive means for moving said carriage means along a linear path relative to said first and second shuttle means.

40. An apparatus as set forth in claim 37 wherein said first shuttle means is movable along a first linear path relative to said carriage means, said carriage means is movable along the first linear path relative to said first and second shuttle means, and said second shuttle means is movable along the first linear path relative to said carriage means.

41. An apparatus as set forth in claim 37 wherein said carriage means includes first surface means for engaging a container, said first shuttle means including second surface means for engaging a container and means for lowering said second surface means relative to said first surface means when said first shuttle means and said carriage means are in the second condition to transfer a container from said second surface means to said first surface means, said second shuttle means including third surface means for engaging a container and means for raising said third surface means relative to said first surface means when said second shuttle means and said carriage means are in the second condition to transfer a container from said first surface means to said third surface means.

42. An apparatus as set forth in claim 30 wherein said first shuttle means includes a first movable base section, a first support section connected with said first base section and movable relative to said first base section between a raised position and a lowered position, first support section drive means for moving said first support section between the raised and lowered positions, and first shuttle drive means for moving said first base section from a retracted position offset to one side of said carriage means to an extended position in which said first support section is in an overlapping relationship with said carriage means, said first shuttle drive means being operable to move said first base section from the retracted position to the extended position with said first support section in the raised position and with a container on said first support section, said first support section drive means being operable to move said first support section from the raised position to the lowered position with said first base section in the extended position to transfer a container from said first support section to said carriage means, said first shuttle drive means being operable to move said first base section from the extended position to the retracted position with said first support section in the lowered position.

43. An apparatus as set forth in claim 42 wherein said second shuttle means includes a second movable base section, a second support section connected with said second base section and movable relative to said second base section between a raised position and a lowered position, second support section drive means for moving said second support section between the raised and lowered positions, and second shuttle drive means for moving said second base section from a retracted position offset to a side of said carriage means opposite from the one side to an extended position in which said second support section is in an overlapping relationship with said carriage means, said second shuttle drive means being operable to move said second base section from the retracted position to the extended position with said second support section in the lowered position, said second support section drive means being operable to move said second support section from the lowered position to the raised position with said second base section in the extended position to transfer a container from said carriage means to said second support section, said second shuttle drive means being operable to move said second base section from the extended position to the retracted position with said second support section in the raised position and with the container on said second support section.

44. An apparatus as set forth in claim 30 wherein said carriage means includes motor means for moving said carriage means along a linear path between a first end of a stroke position in which said carriage means is adjacent to said first shuttle means and a second end of stroke position in which said carriage means is adjacent to said second shuttle means, said first shuttle means being movable between a retracted condition in which said first shuttle means is offset to one side of said carriage means when said carriage means is in the first end of stroke position and an extended condition in which said first shuttle means and carriage means are disposed in an overlapping relationship when said carriage means is in said first end of stroke position, said second shuttle means being movable between a retracted condition in which said second shuttle means is offset to a side of said carriage means opposite from said one side when said carriage means is in the second end of stroke position and an extended condition in which said second shuttle means and carriage means are disposed in an overlapping relationship when said carriage means is in said second end of stroke position.

45. An apparatus as set forth in claim 44 wherein said carriage means includes a first end portion which is adjacent to said first shuttle means when said carriage means is at the first end of stroke position and a second end portion which is adjacent to said second shuttle means when said carriage means is at the second end of stroke position, said second end portion of said carriage means being disposed at the work station when said carriage means is at the first end of stroke position, said first end portion of said carriage means being disposed at the work station when said carriage means is at the second end of stroke position.

46. An apparatus as set forth in claim 44 wherein said first shuttle means includes surface means for at least partially defining a first slot into which said carriage means extends when said first shuttle means is in the extended condition and said carriage means is at the first end of stroke position, said second shuttle means including surface means for at least partially defining a second slot into which said carriage means extends when said second shuttle means is in the extended condition and said carriage means is at the second end of stroke position.

47. A method of sequentially loading sheet material articles into a plurality of compartments in each of a plurality of containers, said method comprising the steps of supporting an empty container on a first shuttle assembly, moving a carriage assembly and the first shuttle assembly into an overlapping relationship with each other, transferring the empty container from the first shuttle assembly to the carriage assembly while the first shuttle assembly and carriage assembly are in the overlapping relationship, loading sheet material articles into a first compartment of the container while the container is supported by the carriage assembly with the first compartment of the container at a loading station, moving the carriage assembly to move the first compartment of the container from the loading station and to move the second compartment of the container to the loading station, loading sheet material articles into the second compartment of the container while the container is supported by the carriage assembly with the second compartment of the container at the loading station, moving the carriage assembly and a second shuttle assembly into an overlapping relationship with each other, transferring the container with compartments loaded with sheet material articles from the carriage assembly to the second shuttle assembly while the carriage assembly and second shuttle assembly are in the overlapping relationship, and moving the carriage assembly and second shuttle assembly out of the overlapping relationship with each other while the container with compartments loaded with sheet material articles is supported by the second shuttle assembly.

48. A method as set forth in claim 47 wherein said step of moving the carriage assembly and first shuttle assembly into an overlapping relationship includes moving the first shuttle assembly relative to the carriage assembly from a retracted condition to an extended condition with the empty container supported by the first shuttle assembly, said step of moving the carriage assembly and second shuttle assembly into an overlapping relationship with each other includes moving the second shuttle assembly relative to the carriage assembly from a retracted condition to an extended condition with the container with compartments loaded with sheet material articles supported by the carriage assembly.

49. A method as set forth in claim 48 wherein said step of moving the carriage assembly and second shuttle assembly out of the overlapping relationship with each other includes moving the second shuttle assembly from the extended condition to the retracted condition with the container having compartments loaded with sheet material articles supported by the second shuttle assembly.

50. A method as set forth in claim 47 wherein said step of transferring the empty container from the first shuttle assembly to the carriage assembly includes providing relative vertical movement between the empty container and carriage assembly, said step of transferring the container with compartments loaded with sheet material articles from the carriage assembly to the second shuttle assembly includes providing relative vertical movement between the container loaded with sheet material articles and the second shuttle assembly.

51. A method as set forth in claim 47 wherein said step of moving the carriage assembly to move the first compartment of the container from the loading station and to move second compartment of the container to the loading station includes moving the carriage assembly and container together along a linear path.

52. A method as set forth in claim 47 wherein said step of moving the carriage assembly to move the first compartment of the container from the loading station and to move the second compartment of the container to the loading station includes rotating at least a portion of the carriage assembly and container together about a vertical axis.

53. A method as set forth in claim 52 further including the step of moving at least a portion of the carriage assembly and the container away from a loader assembly disposed at the loading station prior to performing said step of rotating at least a portion of the carriage and the container about a vertical axis.

54. A method as set forth in claim 49 further including the steps of moving the empty container to a position in which the empty container is disposed over the first shuttle assembly and is supported independently of said first shuttle assembly on support elements, raising at least a portion of said first shuttle assembly and the empty container to engage the empty container with the first shuttle assembly and to lift the empty container off of the support elements, said step of transferring the empty container from the first shuttle assembly to the carriage assembly including lowering at least a portion of the first shuttle assembly and the empty container to engage the empty container with the carriage assembly and to disengage the first shuttle assembly from the container.

55. A method as set forth in claim 54 wherein said step of transferring the container with compartments loaded with sheet material articles from the carriage assembly to the second shuttle assembly includes raising at least a portion of the second shuttle assembly to engage the container loaded with sheet material articles with the second shuttle assembly and to lift the container loaded with sheet material articles off of the carriage assembly.

56. A method of sequentially loading sheet material articles into a plurality of compartments in a container, said method comprising the steps of positioning a container with a first compartment of the container at a loading station, loading sheet material articles into the first compartment of the container while the first compartment of the container is at the loading station, moving a second compartment of the container to the loading station, said step of moving the second compartment of the container to the loading station including moving the container along a linear path, loading sheet material articles into the second compartment of the container while the second compartment of the container is at the loading station, moving a third compartment of the container to the loading station, said step of moving a third compartment of the container to the loading station including rotating the container about a vertical axis, loading sheet material articles into the third compartment of the container while the third compartment of the container is at the loading station, and moving a fourth compartment of the container to the loading station, said step of moving a fourth compartment of the container to the loading station including moving the container along the linear path.

57. A method as set forth in claim 56 wherein said steps of loading sheet material articles into the first, second, third and fourth compartments of the container each include moving the sheet material articles downwardly through openings at an upper end of the container.

58. A method as set forth in claim 56 wherein said step of loading sheet material articles into the first, second, third and fourth compartments of the container each include supporting sheet material articles on a loader platform element, moving the loader platform element downwardly through an opening at an upper end of the container and along a vertical slot formed in a side wall of the container to lower sheet material articles into the container, and, thereafter withdrawing the loader platform element from the container through the vertical slot in the side wall of the container.

59. A method as set forth in claim 56 wherein said step of loading sheet material articles into the second compartment of the container is performed prior to performance of said step of rotating the container about a vertical axis.

60. A method as set forth in claim 56 further including steps of moving the container to a position over a carriage assembly, and lowering the container to position the container on the carriage assembly, said steps of loading sheet material articles into the first, second, third and fourth compartments of the container being performed with the container supported on the carriage assembly.

61. A method as set forth in claim 60 further including the steps of raising the container with compartments loaded with sheet material articles to a position above the carriage assembly, and moving the container with the compartments loaded with sheet material articles away from the carriage assembly.

62. A method as set forth in claim 56 further including the step of supporting the container on a carriage assembly during performance of said steps of loading sheet material articles into a first, second, third, and fourth compartments of the containers, said steps of moving the container along the linear path including moving at least a portion of the carriage assembly along the linear path, said step of rotating the container about a vertical axis including rotating at least a portion of the carriage assembly about a vertical axis.

63. An apparatus for use in sequentially loading sheet material articles into a container having a plurality of compartments each of which has an open upper end portion and a side opening extending from an upper end portion to a lower end portion of the container, said apparatus comprising loader means for moving a stack of sheet material downwardly through the open upper end portion of each of the plurality of compartments in turn at a loading station to sequentially load stacks of sheet material into compartments of the container, said loader means including stack support means which extends through a side opening to each of the compartments in turn at the loading station to support a stack of sheet material as the stack of sheet material moves downwardly in a compartment at the loading station, and carriage means for moving each of the compartments of the container in turn to the loading station, said carriage means including a base, a turntable having surface means for engaging the container, means for supporting said turntable for rotation relative to said base, means for rotating said turntable relative to said base with the container on the turntable to move the container from a first orientation in which first and second compartments of the container are on a side of the container toward said loader means to a second orientation in which third and fourth compartments of the container are on a side of the container toward said loader means, and means for moving said turntable along a linear path between a position in which the first compartment of the container is at the loading station and a position in which the second compartment of the container is at the loading station while the container is in the first orientation and for moving said turntable along the linear path between a position in which the third compartment of the container is at the loading station and a position in which the fourth compartment of the container is at the loading station while the container is in the second orientation.

64. An apparatus as set forth in claim 63 wherein said carriage means further includes means for moving said turntable along a path extending transversely to the linear path between a loading position in which said turntable is spaced a first distance from said loader means and an indexing position in which said turntable is spaced a second distance from said loader means, said second distance being greater than said first distance, said means for rotating said turntable being operable to rotate said turntable when said turntable is at the indexing position.

65. An apparatus as set forth in claim 64 wherein said means for supporting said turntable for rotation relative to said base includes an intermediate section movably mounted on said base, a support element rotatably mounted on said intermediate section and connected with said turntable, a pinion gear connected with said support element, a rack gear disposed in meshing engagement with said pinion gear, and motor means connected with said intermediate section and said rack gear for moving said rack gear to rotate said pinion gear and said turntable relative to said base.

66. An apparatus as set forth in claim 65 wherein said means for moving said turntable between a loading position and an indexing position include motor means connected with said intermediate section and said base.

67. A method of sequentially handling containers having a plurality of compartments for sheet material articles, said method comprising the steps of supporting a container on a first shuttle assembly, moving a carriage assembly and the first shuttle assembly into an overlapping relationship with each other, transferring the container from the first shuttle assembly to the carriage assembly while the first shuttle assembly and carriage assembly are in the overlapping relationship, moving sheet material articles relative to a first compartment of the container while the container is supported by the carriage assembly with the first compartment of the container at a work station, moving the carriage assembly to move the first compartment of the container from the work station and to move the second compartment of the container to the work station, moving sheet material articles relative to the second compartment of the container while the container is supported by the carriage assembly with the second compartment of the container at the work station, moving the carriage assembly and a second shuttle assembly into an overlapping relationship with each other, transferring the container from the carriage assembly to the second shuttle assembly while the carriage assembly and second shuttle are in the overlapping relationship, and moving the carriage assembly and second shuttle assembly out of the overlapping relationship with each other while the container is supported by the second shuttle assembly.

68. A method as set forth in claim 67 wherein said step of moving the carriage assembly and first shuttle assembly into an overlapping relationship includes moving the first shuttle assembly relative to the carriage assembly from a retracted condition to an extended condition with the container supported by the first shuttle assembly, said step of moving the carriage assembly and second shuttle assembly into an overlapping relationship with each other includes moving the second shuttle assembly relative to the carriage assembly from a retracted condition to an extended condition with the container supported by the carriage assembly.

69. A method as set forth in claim 68 wherein said step of moving the carriage assembly and second shuttle assembly out of the overlapping relationship with each other includes moving the second shuttle assembly from the extended condition to the retracted condition with the container supported by the second shuttle assembly.

70. A method as set forth in claim 67 wherein said step of transferring a container from the first shuttle assembly to the carriage assembly includes providing relative vertical movement between the container and carriage assembly, said step of transferring the container from the carriage assembly to the second shuttle assembly includes providing relative vertical movement between the container and the second shuttle assembly.

71. A method as set forth in claim 67 wherein said step of moving the carriage assembly to move the first compartment of the container from the work station and to move second compartment of the container to the work station includes moving the carriage assembly and container together along a linear path.

72. A method as set forth in claim 67 wherein said step of moving the carriage assembly to move the first compartment of the container from the work station and to move the second compartment of the container to the work station includes rotating at least a portion of the carriage assembly and container together about a vertical axis.

73. A method as set forth in claim 72 further including the step of moving at least a portion of the carriage assembly and the container away from a material handling assembly disposed at the work station prior to performing said step of rotating at least a portion of the carriage and the container about a vertical axis.

74. An apparatus for use in sequentially handling containers having compartments for sheet material articles, said apparatus comprising sheet material handling means for moving sheet material relative to compartments of the containers when the containers are at a work station, carriage means for supporting each of the containers in turn at the work station, first shuttle means disposed adjacent to a first side of said carriage means for sequentially transferring containers to said carriage means, said first shuttle means and said carriage means being movable from an offset relationship to an overlapping relationship to facilitate the transfer of a container from said first shuttle means to said carriage means, and second shuttle means disposed adjacent to a second side of said carriage means opposite from said first side of said carriage means for sequentially transferring containers from said carriage means said second shuttle means and said carriage means being movable from an overlapping relationship to an offset relationship to facilitate the transfer of a container from said carriage means to said second shuttle means.

75. An apparatus as set forth in claim 74 wherein said carriage means includes means for rotating a container disposed on said carriage means about a vertical axis to change the orientation of the container relative to said sheet material handling means.

76. An apparatus as set forth in claim 74 wherein said carriage means includes means for moving a container away from said sheet material handling means along a linear path to an indexing station and for moving the container toward the sheet material handling means from the indexing station, said carriage means including means for rotating a container disposed on said carriage means about a vertical axis to change the orientation of the container relative to said sheet material handling means while the container is at the indexing station.

77. An apparatus as set forth in claim 74 wherein said first shuttle means and said carriage means are vertically movable relative to each other when they are in the overlapping relationship to transfer a container from said first shuttle means to said carriage means, said second shuttle means and said carriage means being vertically movable relative to each other when the are in the overlapping relationship to transfer a container from said carriage means to said second shuttle means.

78. An apparatus as set forth in claim 74 wherein said carriage means includes first surface means for engaging a container, said first shuttle means including second surface means for engaging a container and means for moving said second surface means relative to said first surface means when said first shuttle means and said carriage means are in the overlapping relationship to transfer a container from said second surface means to said first surface means, said second shuttle means including third surface means for engaging a container and means for moving said third surface means relative to said first surface means when said second shuttle means and said carriage means are in the overlapping relationship to transfer a container from said first surface means to said third surface means.

79. An apparatus as set forth in claim 74 wherein said first shuttle means includes a first movable base section, a first support section connected with said first base section and movable relative to said first base section between a raised position and a lowered position, first support section drive means for moving said first support section between the raised and lowered positions, and first shuttle drive means for moving said first base section from a retracted position offset to one side of said carriage means to an extended position in which said first support section is in an overlapping relationship with said carriage means to thereby move said first shuttle means and said carriage means from the offset relationship to the overlapping relationship, said first shuttle drive means being operable to move said first base section from the retracted position to the extended position with said first support section in the raised position and with a container on said first support section, said first support section drive means being operable to move said first support section from the raised position to the lowered position with said first base section in the extended position to transfer a container from said first support section to said carriage means, said first shuttle drive means being operable to move said first base section from the extended position to the retracted position with said first support section in the lowered position.

80. An apparatus as set forth in claim 79 wherein said second shuttle means includes a second movable base section, a second support section connected with said second base section and movable relative to said second base section between a raised position and a lowered position, second support section drive means for moving said second support section between the raised and lowered positions, and second shuttle drive means for moving said second base section from a retracted position offset to a side of said carriage means opposite from the one side to an extended position in which said second support section is in an overlapping relationship with said carriage means to thereby move said second shuttle means and said carriage means from the offset relationship to the overlapping relationship, said second shuttle drive means being operable to move said second base section from the retracted position to the extended position with said second support section in the lowered position, said second support section drive means being operable to move said second support section from the lowered position to the raised position with said second base section in the extended position to transfer a container from said carriage means to said second support section, said second shuttle drive means being operable to move said second base section from the extended position to the retracted position with said second support section in the raised position and with the container on said second support section.

* * * * *

UNITED STATES PATENT AND TRADEMARK OFFICE
CERTIFICATE OF CORRECTION

PATENT NO. : 5,069,598

DATED : December 3, 1991

INVENTOR(S) : Robert A. Bryson and Stephen R. Kleinhen

It is certified that error appears in the above-identified patent and that said Letters Patent is hereby corrected as shown below:

Column 32, Line 50, Claim 54, change "49" to --47--.

Column 33, Line 37, Claim 58, change "step" to --steps--.

Column 34, Line 2, Claim 62, change "containers" to --container--.

Signed and Sealed this

Twenty-seventh Day of April, 1993

Attest:

MICHAEL K. KIRK

Attesting Officer

Acting Commissioner of Patents and Trademarks